(12) United States Patent
Maeda et al.

(10) Patent No.: US 8,060,047 B2
(45) Date of Patent: Nov. 15, 2011

(54) SIGNAL FREQUENCY BAND DETECTION DEVICE

(75) Inventors: Koji Maeda, Yokosuka (JP); Anass Benjebbour, Yokosuka (JP); Takahiro Asai, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1202 days.

(21) Appl. No.: 11/754,607

(22) Filed: May 29, 2007

(65) Prior Publication Data

US 2008/0125071 A1 May 29, 2008

(30) Foreign Application Priority Data

May 30, 2006 (JP) .................. 2006-150462

(51) Int. Cl.
H04B 1/10 (2006.01)
(52) U.S. Cl. ......... 455/296; 455/50.1; 455/52.3; 455/63
(58) Field of Classification Search .................. 455/296
See application file for complete search history.

(56) References Cited

U.S. PATENT DOCUMENTS

| 5,355,431 A * | 10/1994 | Kane et al. ..................... 704/226 |
| 5,710,797 A * | 1/1998 | Segal et al. .................... 375/346 |
| 7,327,812 B2 * | 2/2008 | Auer ............................. 375/347 |
| 7,519,488 B2 * | 4/2009 | Fu et al. ......................... 702/69 |
| 2006/0025970 A1 * | 2/2006 | Wegerich ...................... 702/189 |

FOREIGN PATENT DOCUMENTS

| JP | 8-339200 | 12/1996 |
| JP | 10-313497 | 11/1998 |
| JP | 2000-163098 | 6/2000 |
| JP | 2005-140942 | 6/2005 |

OTHER PUBLICATIONS

J.L. Lacoume, et al., "Sources Indentification: A Solution Based on the Cumulants", Proceedings of 4th annual ASSP workshop, Aug. 3, 1988, pp. 199-203.
Kozue Hamamoto, et al., "Dynamic Spectrum Sharing Methods for Cellular Radio Systems", Proceedings 14th Virginia Tech/MPRG Wirelesss Personal Communications Symposium, Jun. 9-11, 2004, pp. 43-49.
"ICA by Maximization of Nongaussianity", Independent Component Analysis, John Wiley & Sons Inc., 2001, pp. 165-197.
V. Capdevielle, et al., "Blind Separation of Wide-Band Sources in the Frequency Domain", 1995 IEEE, 2080-2083.
Extended European Search Report issued Feb. 10, 2011, in Patent Application No. 07252180.0.
Karim Abed-Meraim, et al. "A New Approach to Blind Separation of Cyclostationary Sources", Signal Processing Advances in Wireless Communications, XP-010345680, May 9, 1999, pp. 114-117.

* cited by examiner

Primary Examiner — Duc Nguyen
Assistant Examiner — Ajibola Akinyemi
(74) Attorney, Agent, or Firm — Oblon, Spivak, McClelland, Maier & Neustadt, L.L.P.

(57) ABSTRACT

A signal frequency band detection device is disclosed that is able to separately handle plural co-existing signals, and able to separately detect frequency bands used for transmission of these co-existing signals. The signal frequency band detection device includes a signal decomposition unit that decomposes a received signal into plural signal components with frequency bands of the signal components at least partially overlapping each other; and a frequency band detection unit that, based on respective electrical powers of the signal components, detects the respective frequency bands of the signal components.

8 Claims, 28 Drawing Sheets

FIG.17
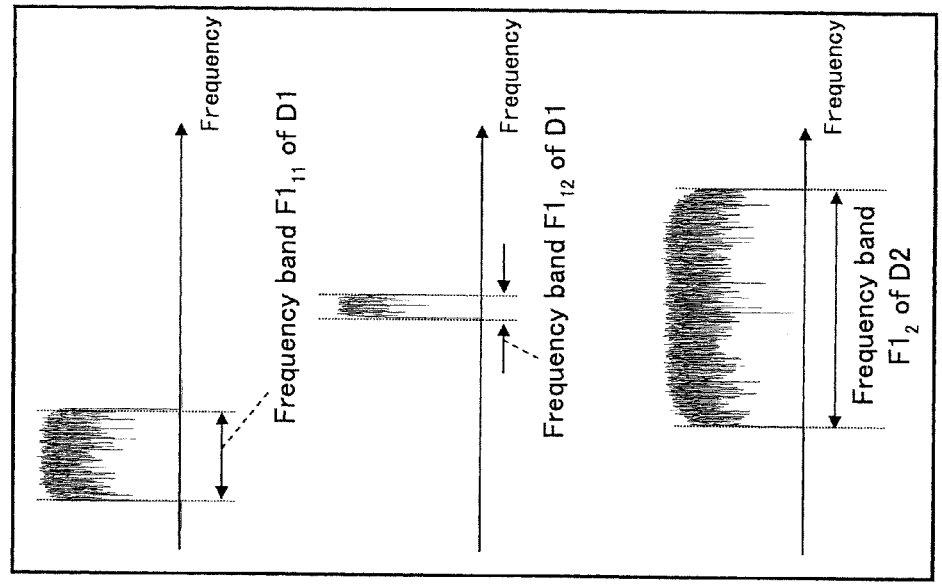
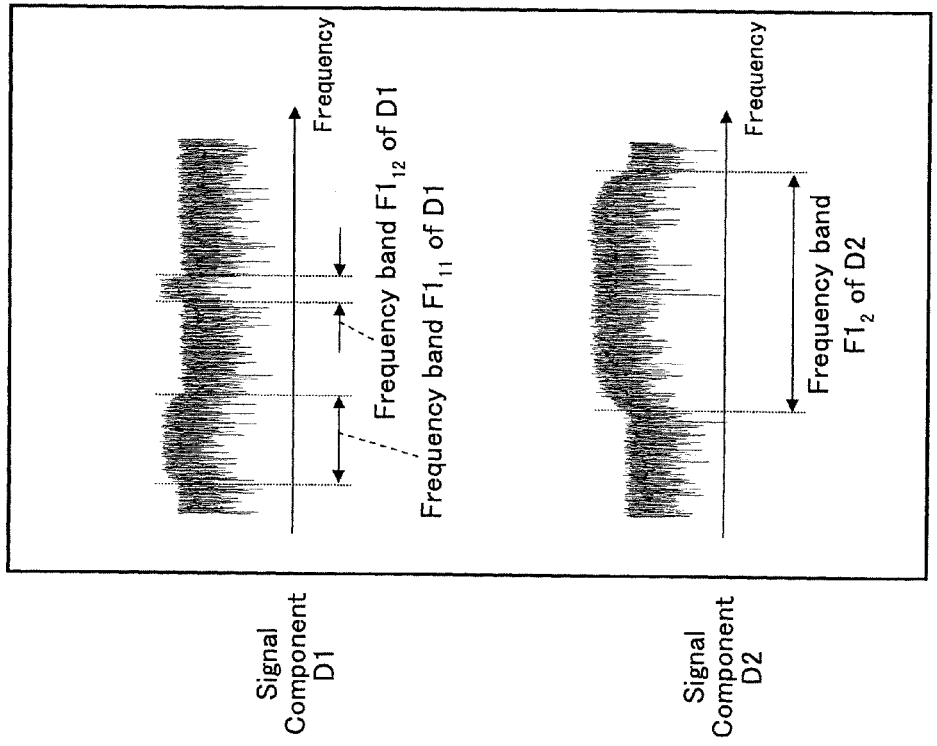

SIGNAL FREQUENCY BAND DETECTION DEVICE

BACKGROUND OF THE INVENTION

1. Field of the Invention

The present invention relates to a signal frequency band detection device used in a wireless receiver for detecting a frequency band of signals received by the wireless receiver.

2. Description of the Related Art

In a wireless communication system, usually, frequency resources are assigned to each system statically, that is, the frequency resources assigned to each system are not adjustable. In order to effectively utilize the frequency resources and time resources of a wireless communication system, it has been proposed to assign the frequency resources dynamically. For example, such a technique is disclosed in "Dynamic Spectrum Sharing Methods for Cellular Radio Systems" Proc. Virginia Tech's 14th Symposium on Wireless Personal Communications, 2004" (hereinafter, referred to as "reference 1").

The dynamic assignment of the frequency resources involves searching for unused frequency bands, dynamically assigning the frequency resources, and carrying out communications. In this way, signals of various frequency bandwidths are assigned to the unused frequency bands, thus the unused frequency bands are reduced, and overall frequency utilization efficiency is improved.

It has been further studied to improve the method of dynamic assignment of the frequency resources to allow a part or all of signal bands in the frequency domain of plural communication systems to be overlapped so that frequency utilization efficiency can be further improved. In this case, when signal bands of different communication systems are overlapped with each other, interference may occur, and performance of signal detection may be degraded. To solve this problem, for example, in the method of dynamic assignment of the frequency resources as disclosed in reference 1, it has been studied to overlap signals to an extent such that signal detection is not affected at the signal reception side.

In this method of dynamically assigning the frequency resources, in order to detect the vacant frequency bands, a method similar to a spectrum analyzer is used.

FIG. 1 is a block diagram illustrating a method of dynamically assigning frequency resources by using a spectrum analyzer.

As shown in FIG. 1, a spectrum analyzer is used to analyze spectra of received signals to detect the vacant frequency bands.

However, the above techniques in the related art suffer from the following problems.

As described above, in the method of analyzing the spectra of the received signals after detection of the vacant frequency bands, if the signal bands of plural communication systems are overlapped, it is difficult to correctly detect the signal bands of plural wireless communication systems.

FIG. 2 is a diagram illustrating the method of dynamically assigning the frequency resources, which allows co-existing of plural wireless communication systems in the same frequency band.

For example, as shown in FIG. 2, assume signals of a wireless communication system A, which have a narrower signal band, and signals of a wireless communication system B, which exist in the whole frequency band, and the method of dynamically assigning the frequency resources is utilized in the systems.

In this case, the signals of the wireless communication system A are overlapped in the signal band of the wireless communication system B. For example, when there are two or more antennae for receiving signals, the received signals can be easily decomposed on the receiver side, and the performance of signal detection is not degraded.

In other words, when utilizing the method of dynamically assigning the frequency resources as shown in FIG. 2, signals of two different wireless communication systems can be overlapped in the same signal band to perform communications without degrading the performance of signal detection. In this case, based on the same thoughts, a region (1) in FIG. 2, namely, a portion of the signal band of the wireless communication system A not overlapping with the signal band of the wireless communication system B can be shared by other wireless communication systems.

However, when using the spectrum analyzer to analyze spectra of the received signals to detect the vacant frequency bands, in the example shown in FIG. 2, in which the method of dynamically assigning the frequency resources is used, if the power spectrum density of the signals of the wireless communication system B is not sufficiently large compared to the power spectrum density of the signals of the wireless communication system A, it is difficult to detect the co-existing situation of two different wireless communication systems, and thus, it is difficult to detect that the region (1) is a vacant frequency band.

SUMMARY OF THE INVENTION

It is a general object of the present invention to solve one or more problems of the related art.

A preferable embodiment of the present invention provides a signal frequency band detection device able to separately handle plural co-existing signals, and able to separately detect signal transmission frequency bands used for transmission of these co-existing signals.

According to a first aspect of the present invention, there is provided a signal frequency band detection device comprising:

a signal decomposition unit that decomposes a received signal into plural signal components with signal transmission frequency bands of the signal components at least partially overlapping each other; and a frequency band detection unit that, based on respective electrical powers of the signal components, detects the respective signal transmission frequency bands of the signal components.

According to the present invention, the signal decomposition unit decomposes the received signal into a plurality of signal components D, and the frequency band detection unit detects the signal transmission frequency bands of the signal components D, due to this, it is possible to detect vacant frequency bands on the receiver side.

As an embodiment, the signal decomposition unit decomposes the received signal into the signal components based on independence of the signal components.

According to the present embodiment, the signal decomposition unit can decompose the received signal into the signal components based on independence of the signal components.

As an embodiment, the received signal is input from a plurality of receiving antennae, and the signal decomposition unit performs Gaussian elimination on one or more of the signal components each having known transmission channels, and detects the other signal components that are interfered with by the one or more signal components.

According to the present embodiment, for one signal component, if conditions of respective transmission channels from a transmitting antenna to the plural receiving antennae can be relatively estimated with the condition of the transmission channel of one receiving antenna as a reference, it is possible to easily reduce the signal component, and as a result, even when other signal components in the received signal are strongly interfered with by this signal component, it is possible to easily detect the signal transmission frequency bands of the other signal components.

As an embodiment, the signal decomposition unit transforms the received signal from a time domain to a frequency domain, and decomposes the resulting signal in the frequency domain into the signal components.

According to the present embodiment, when the received signal has a biased frequency component distribution, it is possible to precisely detect the signal components by utilizing the bias of the frequency component distribution, and precisely detect the signal transmission frequency bands of the signal components.

As an embodiment, the signal decomposition unit decomposes the received signal in a time domain into the signal components, and transforms the signal components from the time domain to a frequency domain.

According to the present embodiment, when the received signal has a biased time component distribution, it is possible to precisely detect the signal components by utilizing the bias of the time component distribution, and precisely detect the signal transmission frequency bands of the signal components. Additionally, when the received signal has both a biased time component distribution and a biased frequency component distribution, it is possible to precisely detect the signal components by utilizing the bias of the distributions, and precisely detect the signal transmission frequency bands of the signal components.

As an embodiment, the frequency band detection unit detects changes of the electrical powers of the signal components in a frequency domain, and detects the signal transmission frequency bands of the signal components based on whether the changes are greater than a predetermined value.

According to the present embodiment, it is possible to detect the signal transmission frequency bands of the signal components without using any transmission parameter information.

Preferably, the signal frequency band detection device further comprises:

a moving average power calculation unit that calculates moving average powers of the signal components in the frequency domain, wherein the frequency band detection unit detects the signal transmission frequency bands of the signal components based on the moving average powers in the frequency domain.

According to the present embodiment, it is possible to precisely detect the signal transmission frequency bands of the signal components without using any transmission parameter information.

As an embodiment, the signal frequency band detection device further comprises:

a noise determination unit that determines whether one of the signal components corresponding to one of the detected signal transmission frequency bands is noise, and outputs the one detected signal transmission frequency band when the corresponding signal component is not noise.

According to the present embodiment, even when noise is detected as a signal, the possibility of erroneously detecting a frequency band of a signal component as an actually used frequency band can be reduced, and due to this, it is possible to improve the precision of detecting the signal transmission frequency bands of the signal components.

As an embodiment, the noise determination unit determines that the corresponding signal component is noise when a frequency bandwidth of the detected signal transmission frequency band is greater than a first predetermined value.

According to the present embodiment, it is possible to easily distinguish signals from noise only by comparison of the signal bandwidths, and it is possible to improve the precision of detecting the signal transmission frequency bands of the signal components. For example, the first predetermined value may be a maximum signal bandwidth available on the receiver side, or the maximum signal bandwidth added with a maximum Doppler frequency of an electrical wave propagation environment.

As an embodiment, the noise determination unit determines that the corresponding signal component is noise when a frequency bandwidth of the detected signal transmission frequency band is less than or equal to a second predetermined value.

According to the present embodiment, it is possible to easily distinguish signals from noise only by comparison of the signal bandwidths, and it is possible to improve the precision of detecting the signal transmission frequency bands of the signal components. For example, the second predetermined value may be a minimum signal bandwidth available on the receiver side.

As an embodiment, the noise determination unit comprises:

a correlation detection unit that detects correlation between the corresponding signal component and the received signal in the detected signal transmission frequency band; and a correlation comparison unit that determines that the corresponding signal component is noise in the detected signal transmission frequency band when the correlation detected by the correlation detection unit is less than or equal to a third predetermined value over a whole sequence of the received signal.

According to the present embodiment, it is possible to easily distinguish signals from noise by utilizing the differences of correlation between the noise and the signals, and it is possible to improve the precision of detecting the signal transmission frequency bands of the signal components.

As an embodiment, the noise determination unit comprises:

a cyclic autocorrelation detection unit that limits the corresponding signal component to the detected signal transmission frequency band and calculates a cyclic autocorrelation of the corresponding signal; and a cyclostationarity-based noise determination unit that, based on the detected cyclic autocorrelation, determines that a signal component in a signal transmission frequency band other than the detected signal transmission frequency band is noise when it is determined that the signal component corresponding to the detected signal transmission frequency band is not noise.

According to the present embodiment, it is possible to precisely determine whether the signal component obtained by decomposition in the detected signal transmission frequency band F1 is noise, and it is possible to improve the precision of detecting the signal transmission frequency bands of the signal components.

As an embodiment, the signal decomposition unit further decomposes the received signal into the signal components in a partial signal transmission frequency band.

According to the present embodiment, weak signal components, which are hidden in the signal components having strong powers in the first signal decomposition, can be detected, and the signal transmission frequency bands of the weak signal components can be determined.

As an embodiment, the partial signal transmission frequency band includes a frequency band out of one signal transmission frequency band among the signal transmission frequency bands of the signal components.

According to the present embodiment, it is possible to perform signal decomposition and detection of the signal transmission frequency bands without being influenced by the signal components corresponding to the signal transmission frequency bands detected in the preceding process of detecting the signal transmission frequency bands.

As an embodiment, the signal frequency band detection device further comprises:

a signal component reduction unit that reduces one or more of the signal components, wherein the signal decomposition unit decomposes the received signal processed by the signal component reduction unit into the signal components, and the frequency band detection unit detects the signal transmission frequency bands of the signal components.

According to the present embodiment, since the signal decomposition and detection of the signal transmission frequency bands are performed by using the signals processed by the signal component reduction unit, in which some signal components are reduced, it is possible to precisely detect the signal transmission frequency bands without being influenced by the signal components that ought to be reduced.

As an embodiment, the signal decomposition unit performs time window processing on the received signal by using a time window having a predetermined width and slides the time window for detection to decompose the received signal in the time domain.

According to the present embodiment, it is possible to perform signal decomposition in detailed time intervals. Additionally, since it is not necessary to perform the signal processing in the whole time domain at one time, it is possible to detect the signal transmission frequency bands with a small amount of calculations.

As an embodiment, the signal decomposition unit performs frequency window processing on the received signal by using a frequency window having a predetermined width and slides the frequency window for detection of the received signal to decompose the received signal in the frequency domain.

According to the present embodiment, it is possible to perform signal decomposition in detailed frequency intervals. Additionally, since it is not necessary to perform the signal processing in the whole frequency domain at one time, it is possible to detect the signal transmission frequency bands with a reduced amount of calculations.

According to the present invention, when plural signals exist, it is possible to handle the signals separately, and to separately detect frequency bands used for transmission of these co-existing signals.

These and other objects, features, and advantages of the present invention will become more apparent from the following detailed description of the preferred embodiments given with reference to the accompanying drawings.

BRIEF DESCRIPTION OF THE DRAWINGS

FIG. 17 shows a procedure of extracting a reference signal by the reference signal generator 12511 in the correlation detection unit 1251;

DESCRIPTION OF THE PREFERRED EMBODIMENTS

Below, preferred embodiments of the present invention are explained with reference to the accompanying drawings. Note that in the following descriptions, the same reference numbers are assigned to the constituent elements having the same functions, and overlapping descriptions are omitted.

First Embodiment

Figure 1:
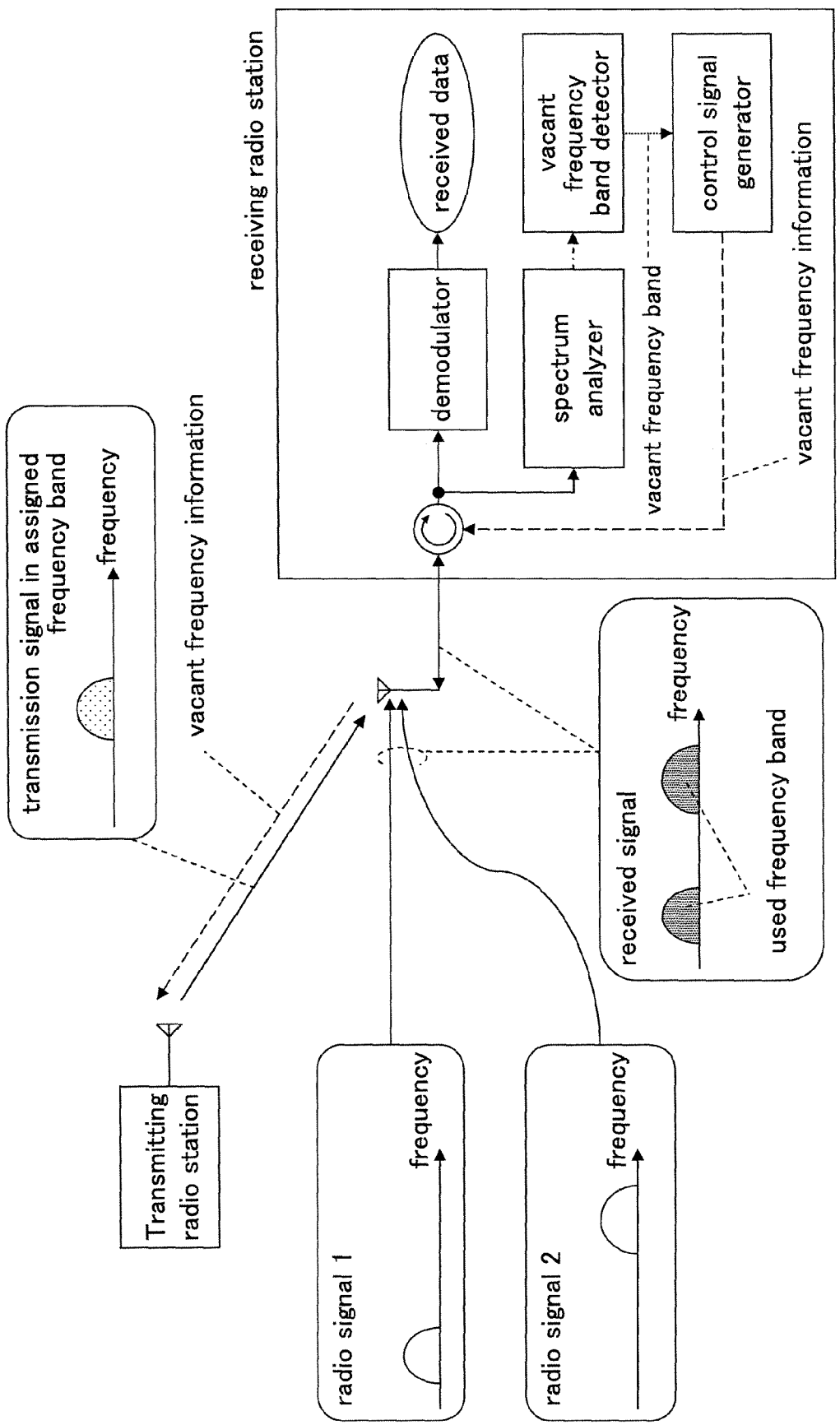
FIG. 1 is a block diagram illustrating a method of dynamically assigning frequency resources by using a spectrum analyzer.
Figure 2:
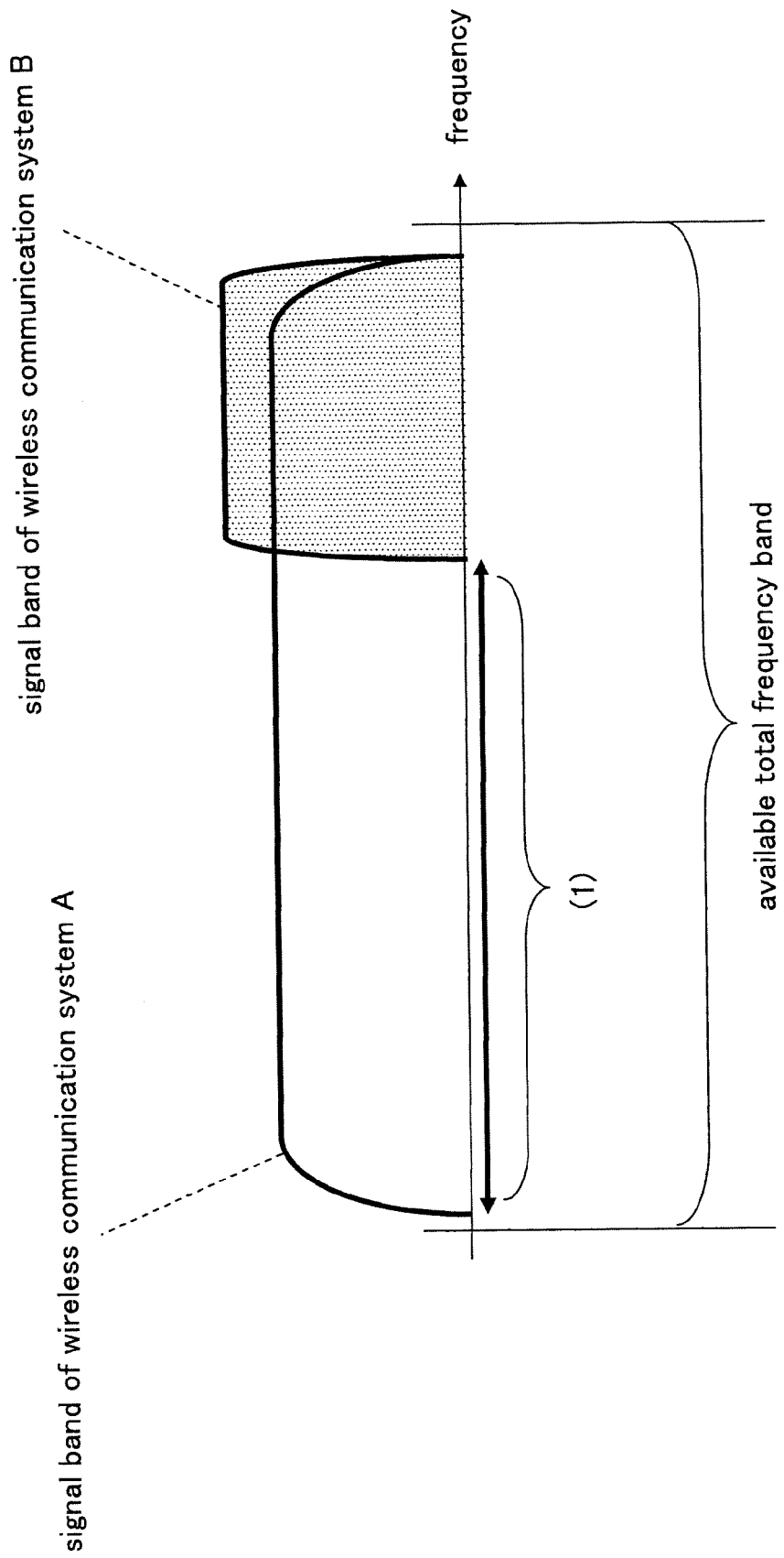
FIG. 2 is a diagram illustrating the method of dynamically assigning the frequency resources, which allows co-existing of plural wireless communication systems in the same frequency band.
Figure 3:
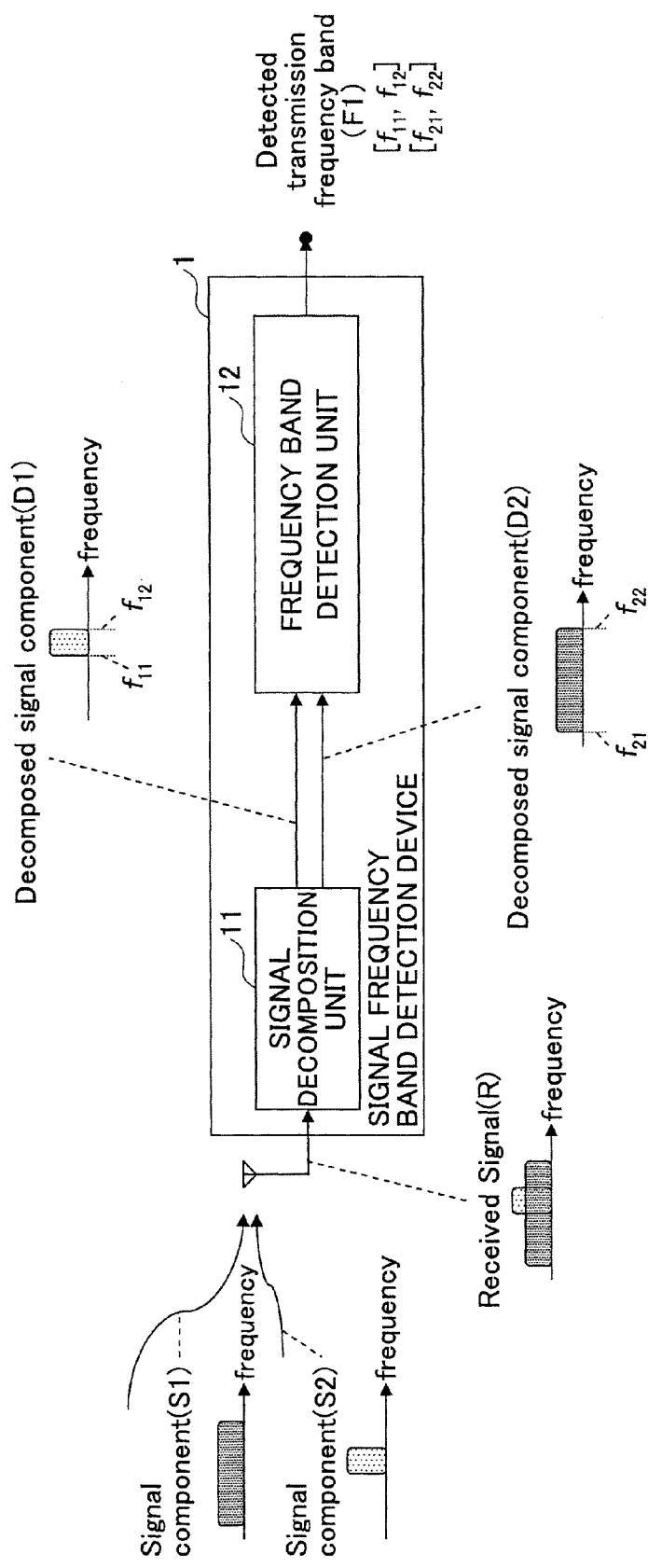
FIG. 3 is a block diagram schematically illustrating a signal frequency band detection device according to a first embodiment of the present invention.

FIG. 3 is a block diagram schematically illustrating a signal frequency band detection device according to a first embodiment of the present invention.

A signal frequency band detection device 1 of the present embodiment as illustrated in FIG. 3 is installed in a radio receiver set, and includes a signal decomposition unit 11 and a frequency band detection unit 12.

In this embodiment, it is assumed that a received signal R includes plural signal components S, and frequency bands for respectively transmitting these signal components S at least partially overlap each other.

The signal decomposition unit 11 decomposes the received signal R into plural signal components. Below, the signal components obtained by signal decomposition are referred to as "decomposed signal components D".

During the signal decomposition process, demodulation of the signal is not required, and waveforms of the obtained signal components are output.

Below, a frequency band from a frequency f1 to frequency f2 is denoted as [f1, f2].

For example, assuming the received signal R includes two superposed signal components, a signal component S1 having a frequency band [f11, f12] and a signal component S2 having a frequency band [f21, f22], the signal decomposition unit 11 decomposes the received signal R, following a procedure as described below, into a decomposed signal component D1 having a frequency band [f11, f12] and a decomposed signal component D2 having a frequency band [f21, f22].

The decomposed signal components D (D1, D2) are input to the frequency band detection unit 12, and from the input decomposed signal components D, the frequency band detection unit 12 detects the frequency bands F1 used for transmitting the signal components S, respectively. Below, "the frequency band used for transmitting the signal component S" is also referred to as "a signal transmission frequency band of the signal component S".

For example, when the decomposed signal component D1 having the frequency band [f11, f12] and the decomposed signal component D2 having the frequency band [f21, f22] are input to the frequency band detection unit 12, the frequency band detection unit 12 detects the frequency band [f11, f12] as the frequency band used for transmitting the signal component S1, and the frequency band [f21, f22] as the frequency band used for transmitting the signal component S2. The frequency band detection unit 12 outputs the detected frequency bands [f11, f12] and [f21, f22] as the resulting frequency bands F1.

Alternatively, the signal decomposition unit 11 may also decompose the received signal R into the decomposed signal components D by a blind process, in which signals are generated based on statistical properties of the signals (as described below). Furthermore, when the received signal R is input from plural receiving antennae, among the signal components included in the received signal R, the signal decomposition unit 11 may perform Gaussian elimination on the signal components each having known transmission channels, and detect other signal components which are interfered with by those signal components having known transmission channels.

Figure 4:
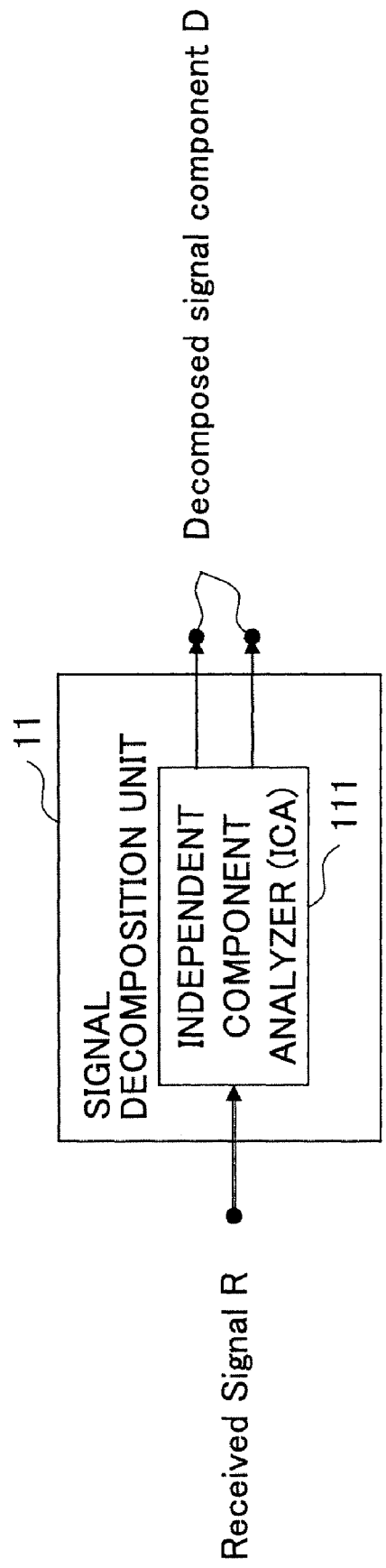
FIG. 4 is a block diagram illustrating an example of the structure of the signal decomposition unit 11 according to the present embodiment.

FIG. 4 is a block diagram illustrating an example of the structure of the signal decomposition unit 11 according to the present embodiment.

As shown in FIG. 4, the signal decomposition unit 11 has an independent component analyzer (ICA) 111.

The independent component analyzer 111 decomposes the received signal R to obtain the decomposed signal components D based on independence of the signal components S.

For this technique, for example, reference can be made to "Independent Component Analysis", John Wiley & Sons, Inc., 2001.

Specifically, the independent component analyzer is a technique which decomposes a signal into plural statistically independent signal components by using only independence of the signal components. In this way, the signal decomposition can be performed without the knowledge of other parameters.

Figure 5:
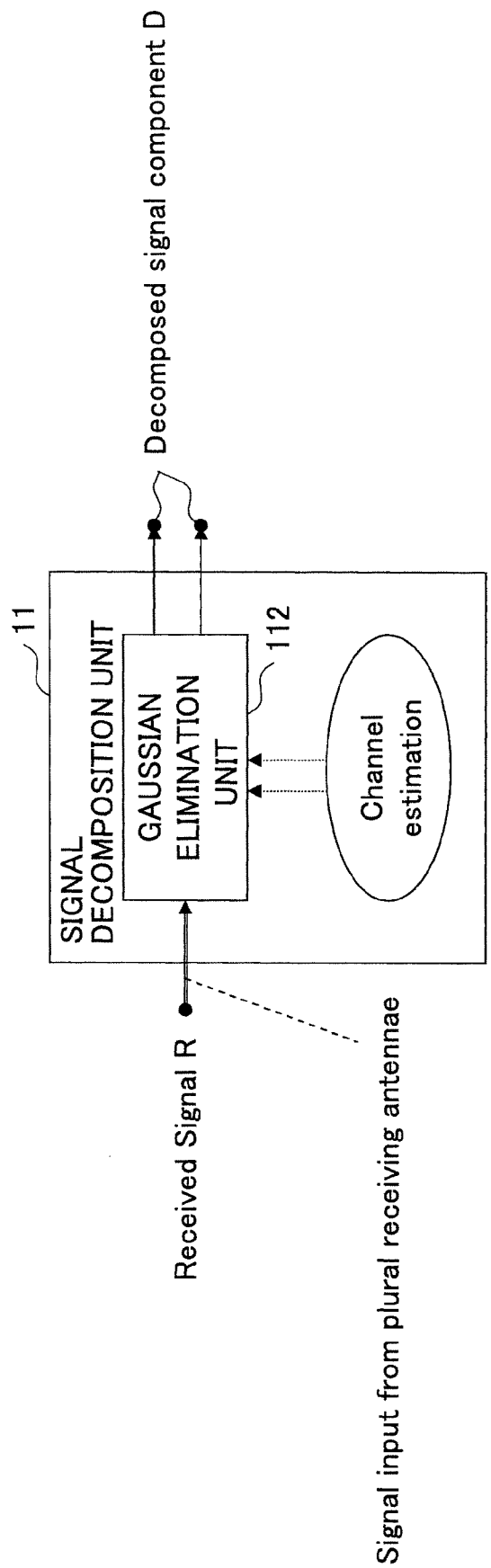
FIG. 5 is a block diagram illustrating another example of the structure of the signal decomposition unit 11 according to the present embodiment.

FIG. 5 is a block diagram illustrating another example of the structure of the signal decomposition unit 11 according to the present embodiment.

As shown in FIG. 5, the signal decomposition unit 11 has a Gaussian elimination unit 112.

The Gaussian elimination unit 112 performs Gaussian elimination on signal components input from plural receiving antennae.

Below, the principle of the Gaussian elimination performed by the Gaussian elimination unit 112 is explained briefly.

The received signal R input from the plural receiving antennae can be expressed by a vector r as in the following equation (1).

$$r = Hs + n \quad (1)$$

where, H represents a transmission channel matrix, and s represents a signal component vector. The transmission channel matrix H and the signal component vector s can be expressed by the following equation (2) and equation (3), respectively.

$$H = \begin{bmatrix} h_{11} & h_{21} \\ h_{12} & h_{22} \end{bmatrix} \quad (2)$$

$$s = [s_1 s_2]^T \quad (3)$$

Thus, the vector r, which represents the received signal R input from the plural receiving antennae, can be expressed by the following equation (4).

$$r = \begin{bmatrix} r_1 \\ r_2 \end{bmatrix} = \begin{bmatrix} h_{11} & h_{21} \\ h_{12} & h_{22} \end{bmatrix} \begin{bmatrix} s_1 \\ s_2 \end{bmatrix} + n = \begin{bmatrix} h_{11}s_1 + h_{21}s_2 + n_1 \\ h_{12}s_1 + h_{22}s_2 + n_2 \end{bmatrix} \quad (4)$$

where, n is additive noise, and $n=(n1+n2)^T$.

Hence, at the receiver, if the transmission channel status (h21, h22) of the signal component s2 is known, the signal component s2 can be suppressed by linear combination.

Specifically, by calculating the value of the left side of the following equation (5), the signal component s1 can be obtained by reducing influence from the signal component s2.

$$h_{22}r_1 - h_{21}r_2 = (h_{22}h_{11} - h_{21}h_{12})s1 + (h_{22}n_1 - h_{21}n_2) \quad (5)$$

In this way, when the received signal R is input from plural receiving antennae, and some signal components have known transmission channels, the signal components having known transmission channels can be reduced by Gaussian elimination, and thus it becomes easy to detect other signal components which are interfered with by the signal components having known transmission channels. In this process, it is not necessary for the receiver to be aware of the transmission channel statuses of the other signal components, which are not to be reduced. Hence, it is possible to precisely detect the other signal components, which do not have known transmission channels.

Figure 6:
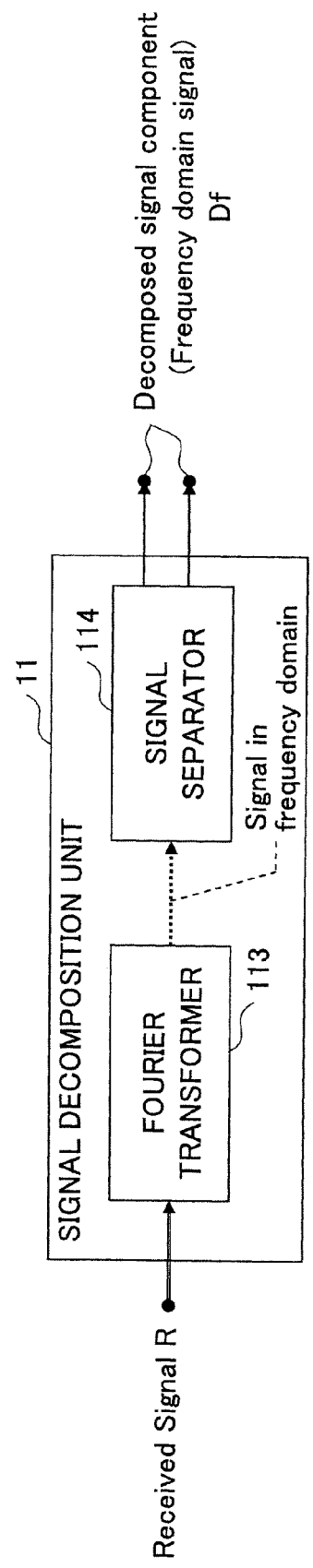
FIG. 6 is a block diagram illustrating another example of the structure of the signal decomposition unit 11 according to the present embodiment.

FIG. 6 is a block diagram illustrating another example of the structure of the signal decomposition unit 11 according to the present embodiment.

As shown in FIG. 6, the signal decomposition unit 11 includes a Fourier transformer 113, and a signal separator 114.

The Fourier transformer 113 transforms the received signal R in a time domain to a signal in a frequency domain (referred to as a "frequency domain signal" where necessary).

The signal separator 114 decomposes the frequency domain signal into the frequency domain decomposed signal components Df, and outputs the frequency domain decomposed signal components Df.

In this way, by performing signal processing in the frequency domain, when the received signal R has a biased frequency component distribution, it is possible to effectively detect the signal components by utilizing the bias of the frequency component distribution, and effectively decompose the received signal R. In addition, it is possible to cancel out influence of delayed waves for signal decomposition. For example, OFDM modulation signals have biased frequency distributions.

Figure 7:
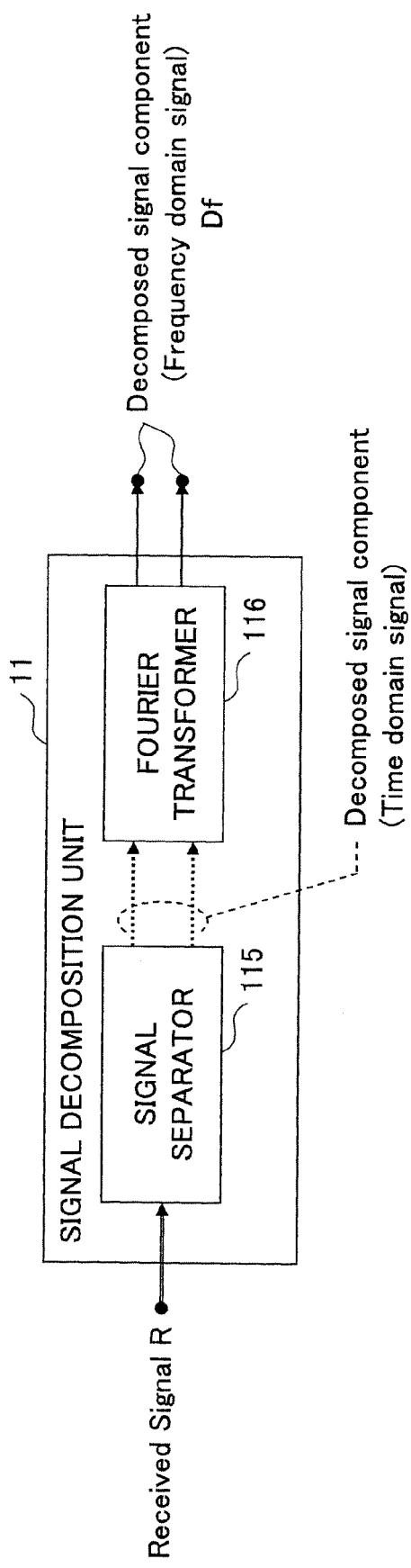
FIG. 7 is a block diagram illustrating another example of the structure of the signal decomposition unit 11 according to the present embodiment.

FIG. 7 is a block diagram illustrating another example of the structure of the signal decomposition unit 11 according to the present embodiment.

As shown in FIG. 7, the signal decomposition unit 11 includes a signal separator 115 and a Fourier transformer 116.

With the received signal R in a time domain as an input signal, the signal separator 115 decomposes the input signal in a certain time interval into the decomposed signal components D in the time domain. The signal separator 115 extracts a time domain decomposed signal component Dt from the decomposed signal components, and outputs the time domain decomposed signal component Dt.

The Fourier transformer 116 transforms the input time domain decomposed signal component Dt to a frequency domain decomposed signal component Df, that is, to a frequency signal, and outputs the frequency domain decomposed signal component Df.

In this way, by performing signal processing in the time domain, especially when decomposing signals based on distribution properties of signals, as in the independent component analyzer, if the received signal R has a biased distribution in time domain, it is possible to effectively detect the signal components by utilizing the bias of the time distribution, and effectively decompose the received signal R. For example, MSK modulation signals, which have a constant signal amplitude, or CDMA signals have biased distributions in time domain.

Figure 8:
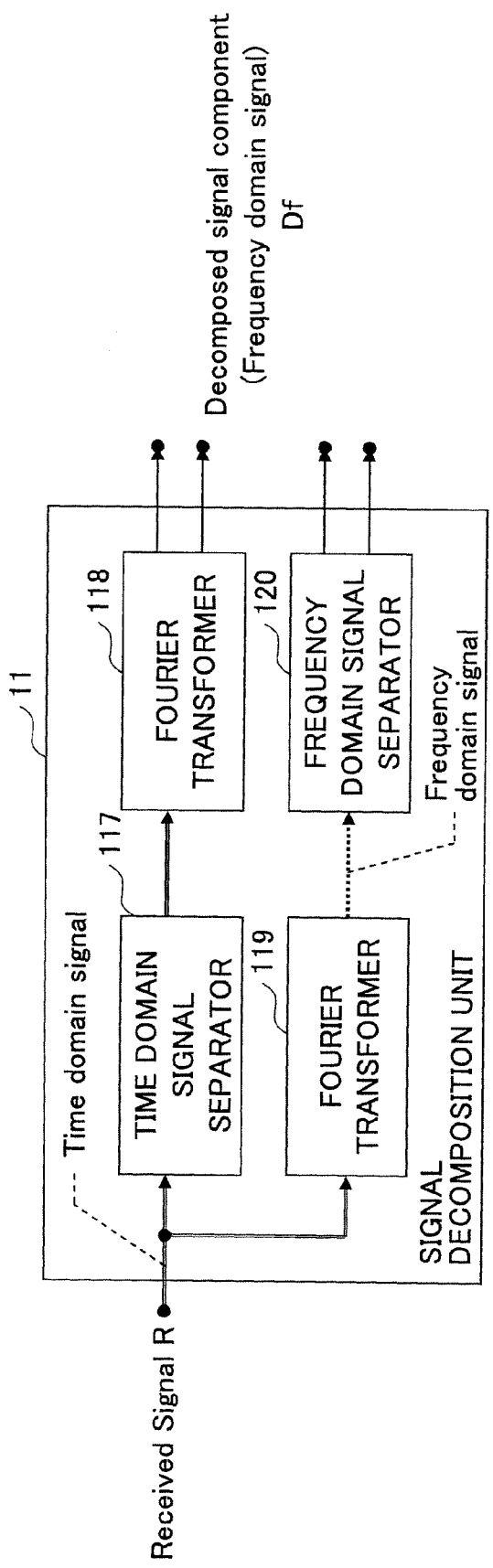
FIG. 8 is a block diagram illustrating another example of the structure of the signal decomposition unit 11 according to the present embodiment.

FIG. 8 is a block diagram illustrating another example of the structure of the signal decomposition unit 11 according to the present embodiment.

As shown in FIG. 8, the signal decomposition unit 11 includes a time domain signal separator 117, a Fourier transformer 118, a Fourier transformer 119, and a frequency domain signal separator 120.

The received signal R in the time domain is input to the time domain signal separator 117 and the Fourier transformer 119 at the same time.

The time domain signal separator 117 decomposes the received signal R in the time domain.

The Fourier transformer 118 transforms the time domain decomposed signal components Dt to frequency domain decomposed signal components Df, and outputs the frequency domain decomposed signal components Df.

At the same time, the Fourier transformer 119 transforms the received signal R into a frequency domain signal. The frequency domain signal separator 120 decomposes the frequency domain signal, and outputs the frequency domain decomposed signal components Df.

With the above configuration, when the received signal R has a biased distribution in both the time domain and the frequency domain, it is possible to effectively detect the signal components by utilizing the bias of the distributions, and effectively decompose the received signal R.

Figure 9A:
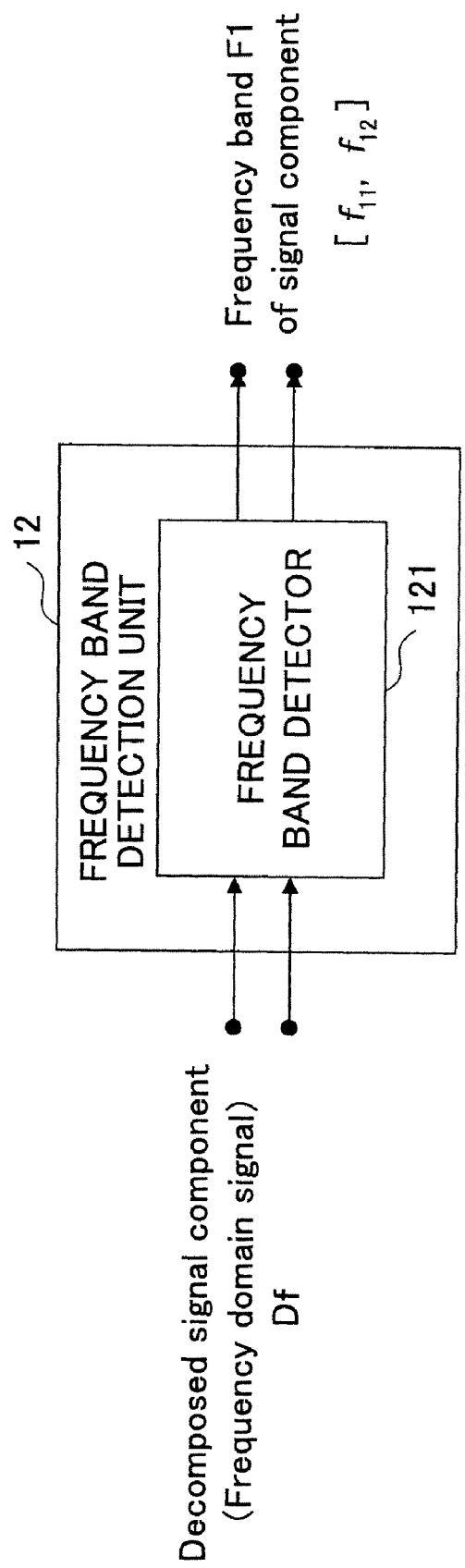
FIG. 9A is a block diagram illustrating an example of the frequency band detection unit 12 according to the present embodiment.

FIG. 9A is a block diagram illustrating an example of the frequency band detection unit 12 according to the present embodiment.

As shown in FIG. 9A, the frequency band detection unit 12 includes a frequency band detector 121.

The frequency band detector 121 detects the frequency bands F1 used for transmitting the signal components S from the frequency domain decomposed signal components Df, which are decomposed in the frequency domain.

Figure 9B:
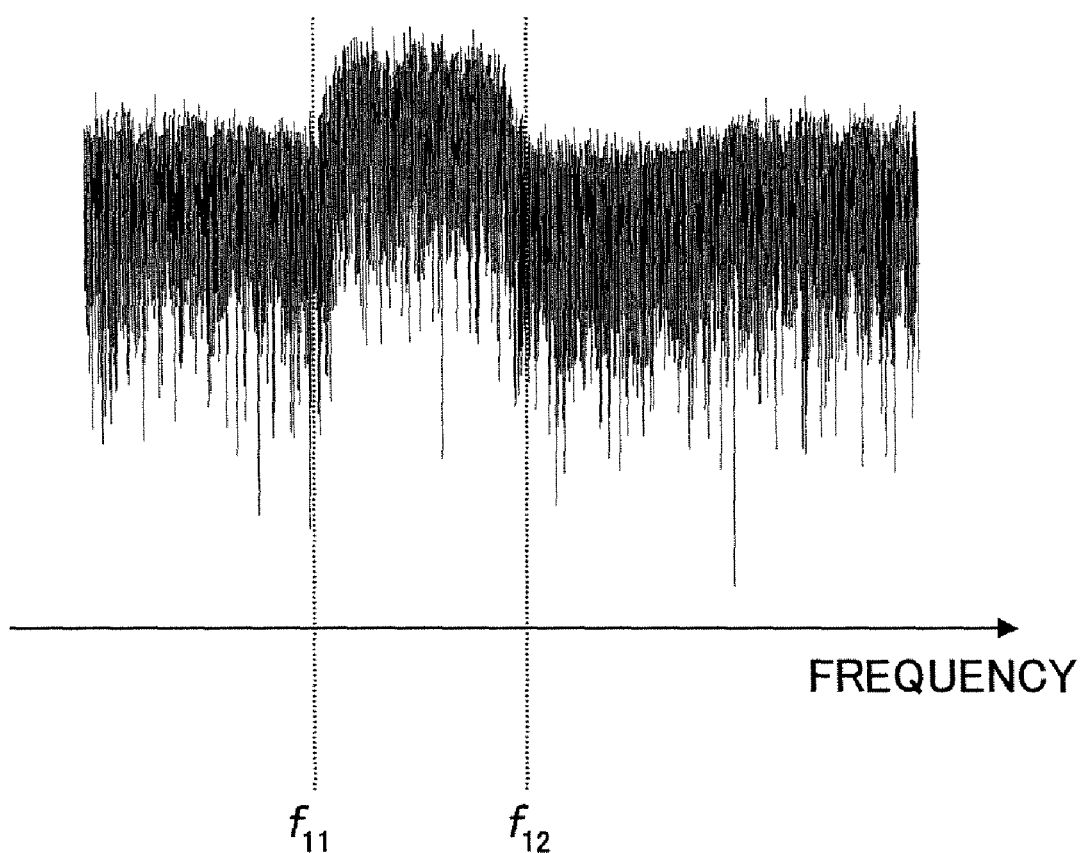
FIG. 9B is a graph showing frequency domain signals for illustrating the frequency band detection unit 12.

FIG. 9B is a graph showing frequency domain signals for illustrating the frequency band detection unit 12.

For example, as shown in FIG. 9B, the frequency band detector 121 detects the amount of fluctuations of the electrical power of the frequency domain decomposed signal components Df in the frequency domain, such as the amount of fluctuations of the reception power or the amplitude, and identifies a range from the frequency at which the signal power increases rapidly to the frequency at which the signal power decreases rapidly as the frequency band F1 used for transmitting the signal components S (that is, the signal transmission frequency band F1 of the signal component S).

For example, in FIG. 9B, the signal transmission frequency band F1 of the signal component S corresponds to the range from a frequency f11, at which the signal power increases rapidly, to a frequency f12, at which the signal power decreases rapidly.

With the above configuration, it is possible to detect the signal transmission frequency band of the signal components S using the decomposed signal components D. For example, based on a preset threshold value of the electrical power, the frequency band detector 121 detects a frequency band having power higher than the threshold value, and further calculates the signal transmission frequency band F1.

Alternatively, the frequency band detector 121 may perform edge search, for example, the wavelet transformation, to search the signal transmission frequency bands and determine the signal transmission frequency band F1.

Figure 10:
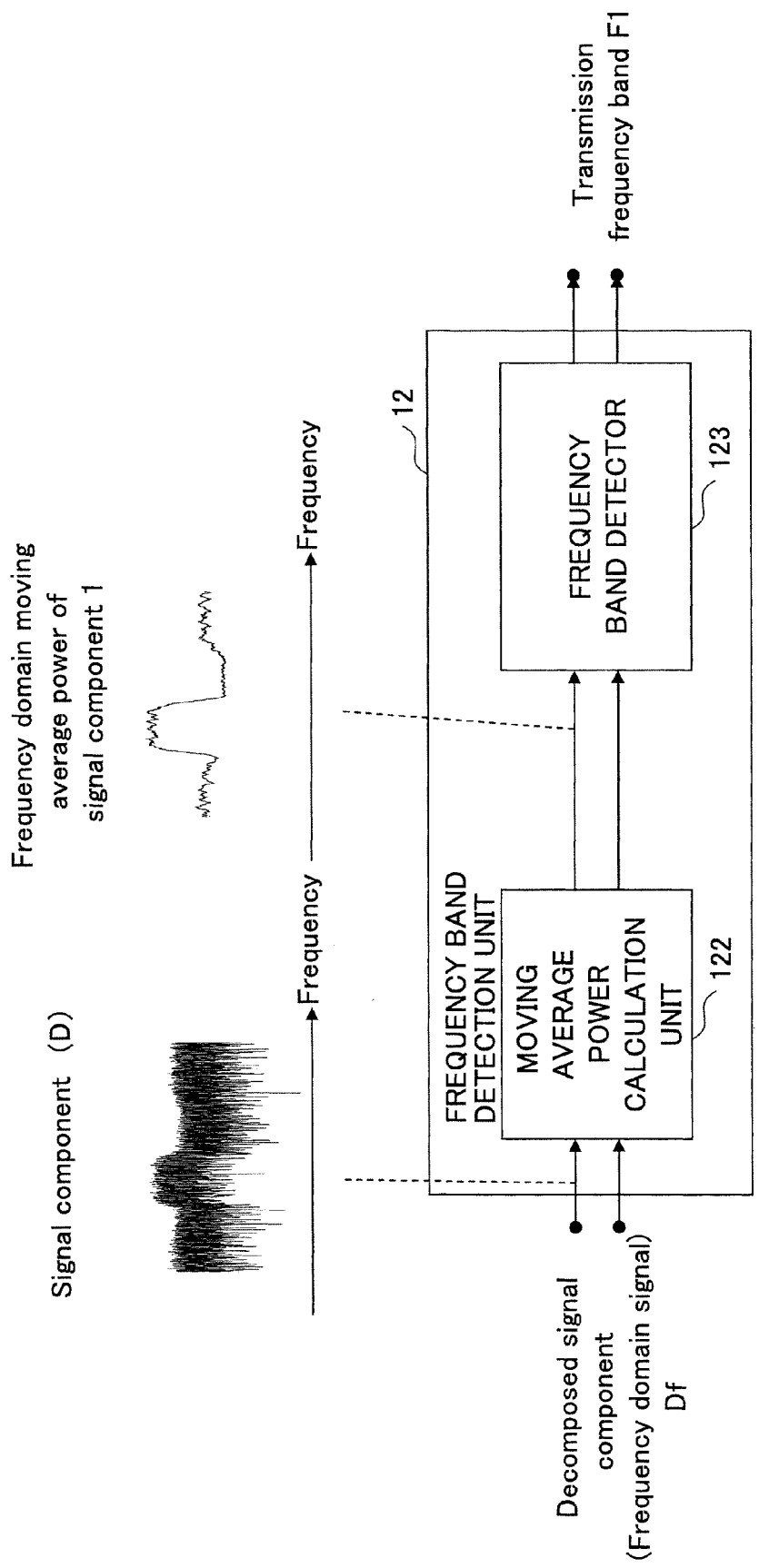
FIG. 10 is a block diagram illustrating another example of the frequency band detection unit 12 according to the present embodiment.

FIG. 10 is a block diagram illustrating another example of the frequency band detection unit 12 according to the present embodiment.

As shown in FIG. 10, the frequency band detection unit 12 includes a moving average power calculation unit 122, and a frequency band detector 123.

The moving average power calculation unit 122 calculates a moving average power of a frequency domain decomposed signal component Df.

Specifically, the frequency domain decomposed signal component Df is input to the moving average power calculation unit 122, and the moving average power calculation unit 122 calculates, for example, a moving average power of a signal component 1 in the frequency domain, and outputs the moving average power. For example, the moving average power calculation unit 122 calculates the average powers of frequency bands each having a preset width, and outputs the average powers sequentially.

The frequency band detector 123 detects the signal transmission frequency band F1 based on the frequency domain moving average powers given by the moving average power calculation unit 122. For example, the frequency band detector 123 performs edge search, for example, wavelet transformation, on the input moving average power to determine the signal transmission frequency band F1.

Figure 11:
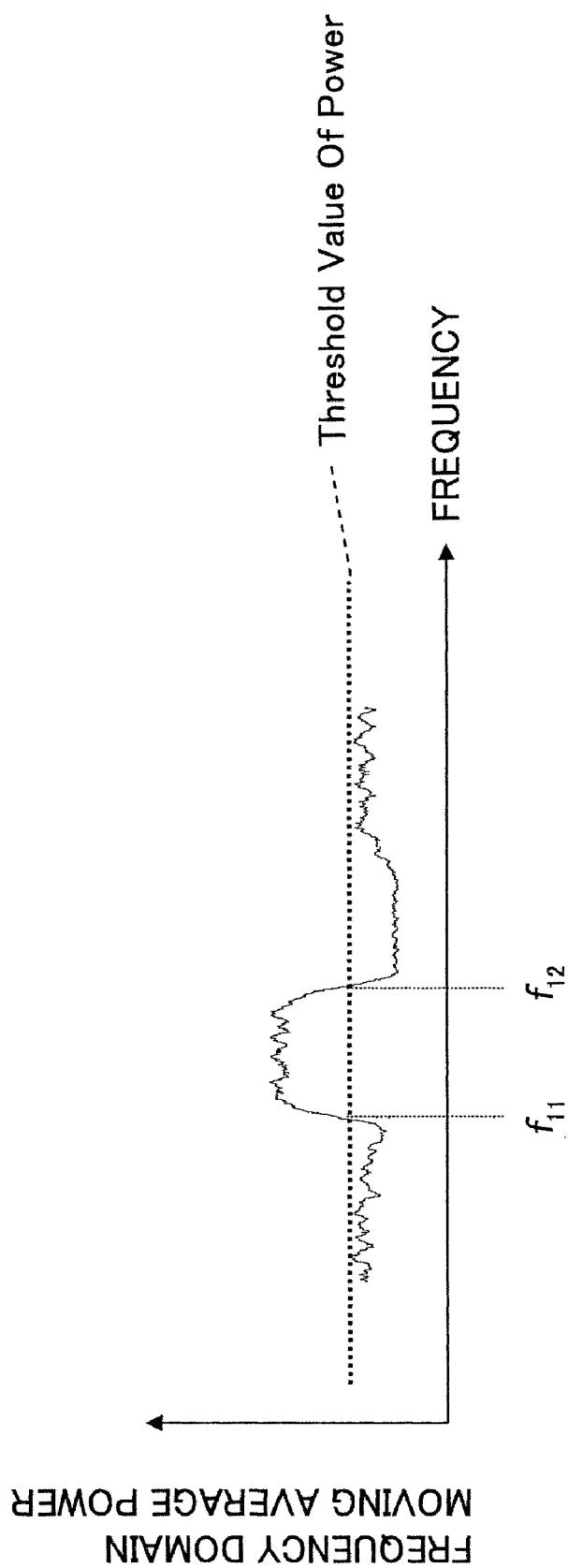
FIG. 11 is a diagram illustrating another method of detecting the signal transmission frequency band in the frequency band detection unit 12.

FIG. 11 is a diagram illustrating another method of detecting the signal transmission frequency band in the frequency band detection unit 12.

As shown in FIG. 11, the frequency band detector 123 may set a threshold value of the electrical power in advance, and when the frequency band detector 123 detects a frequency band having a power higher than the threshold value, the frequency band detector 123 can identify the detected frequency band as the signal transmission frequency band F1. In doing so, it is possible to easily detect the signal transmission frequency band F1.

Figure 12:
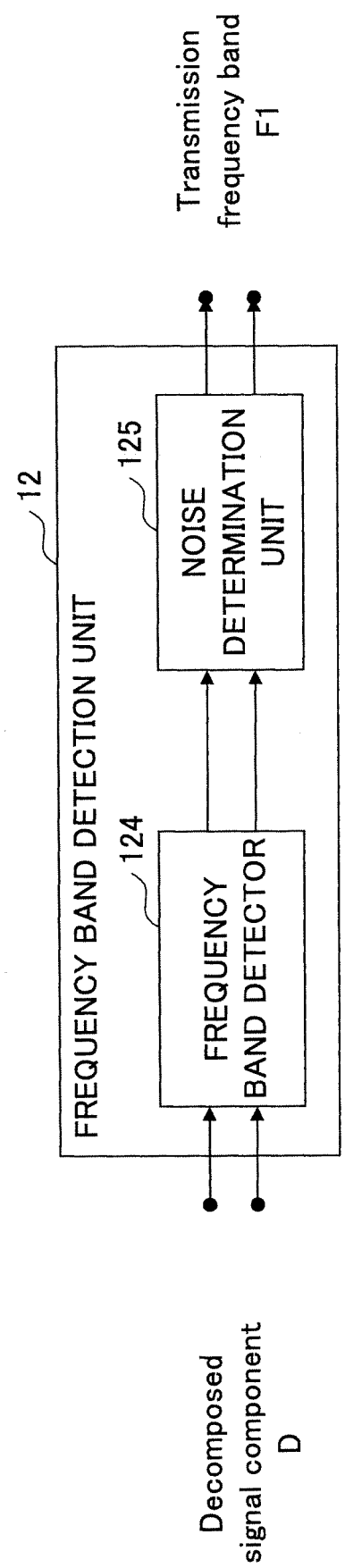
FIG. 12 is a block diagram illustrating another example of the frequency band detection unit 12 according to the present embodiment.

FIG. 12 is a block diagram illustrating another example of the frequency band detection unit 12 according to the present embodiment.

As shown in FIG. 12, the frequency band detection unit 12 includes a frequency band detector 124, and noise determination unit 125.

The frequency band detector 124 detects the signal transmission frequency bands F1. Specifically, the decomposed signal components are input to the frequency band detector 124, and the frequency band detector 124 detects and outputs the signal transmission frequency bands F1 of the signal components.

The noise determination unit 125 determines whether signal components in the signal transmission frequency bands F1, which are detected by the frequency band detector 124, are noise, and to determine noise-related frequency bands. Then, among the signal transmission frequency bands F1 detected by the frequency band detector 124, the noise determination unit 125 identifies a frequency band with the noise-related frequency bands being eliminated as the actual signal transmission frequency band F1. In doing so, it is possible to eliminate the noise-related frequency bands, which may be frequency bands detected erroneously due to existence of the noise, and hence it is possible to precisely determine the signal transmission frequency band F1 of the signal components S.

Figure 13:
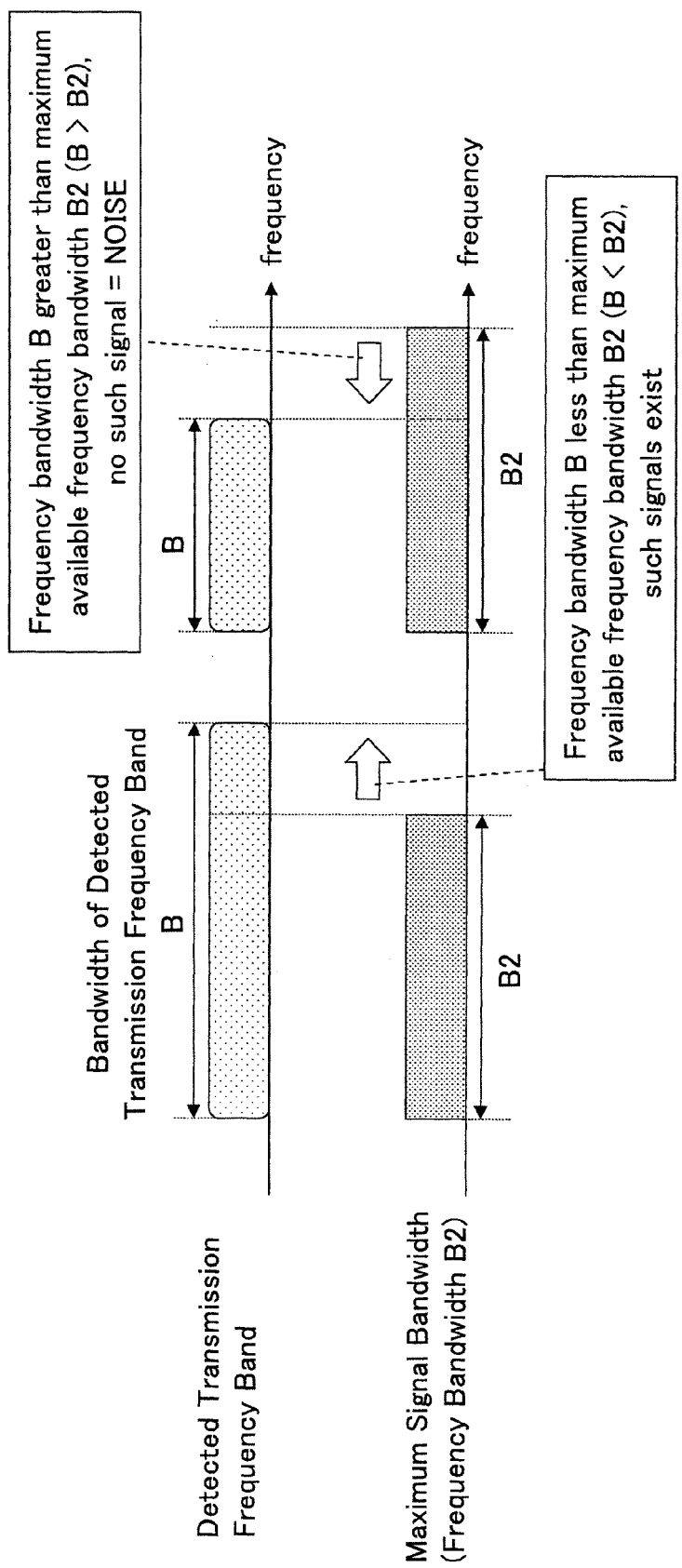
FIG. 13 is a diagram illustrating a method of determining the noise in the noise determination unit 125 by detecting the signal bandwidth of the decomposed signal components.

FIG. 13 is a diagram illustrating a method of determining the noise in the noise determination unit 125 by detecting signal bandwidth of the decomposed signal components.

As shown in FIG. 13, the noise determination unit 125 calculates a signal frequency bandwidth B from the detected signal transmission frequency bands, and determines whether the frequency bandwidth B is greater than a preset frequency bandwidth B2, which corresponds to the first predetermined value in claims of the present application.

For example, the preset frequency bandwidth B2 is a maximum signal bandwidth specified in advance; for example, it may be a maximum signal bandwidth available on the transmitter side, or the maximum signal bandwidth added with a maximum Doppler frequency due to the electrical wave propagation environment. In FIG. 13, it is illustrated that the preset frequency bandwidth B2 is the maximum signal bandwidth available on the transmitter side.

If it is determined that the frequency bandwidth B is greater than the preset frequency bandwidth B2, since there is no signal component which has such a frequency bandwidth B even wider than the maximum available frequency bandwidth B2, the noise determination unit 125 determines that signal components are noise in the detected frequency band.

On the contrary, if it is determined that the frequency bandwidth B is less than the preset frequency bandwidth B2, since it is possible for signal components to have a frequency bandwidth B narrower than the maximum available frequency bandwidth B2, the noise determination unit 125 determines that the decomposed signal components are not noise (that is, a signal) in the detected frequency band.

Figure 14:
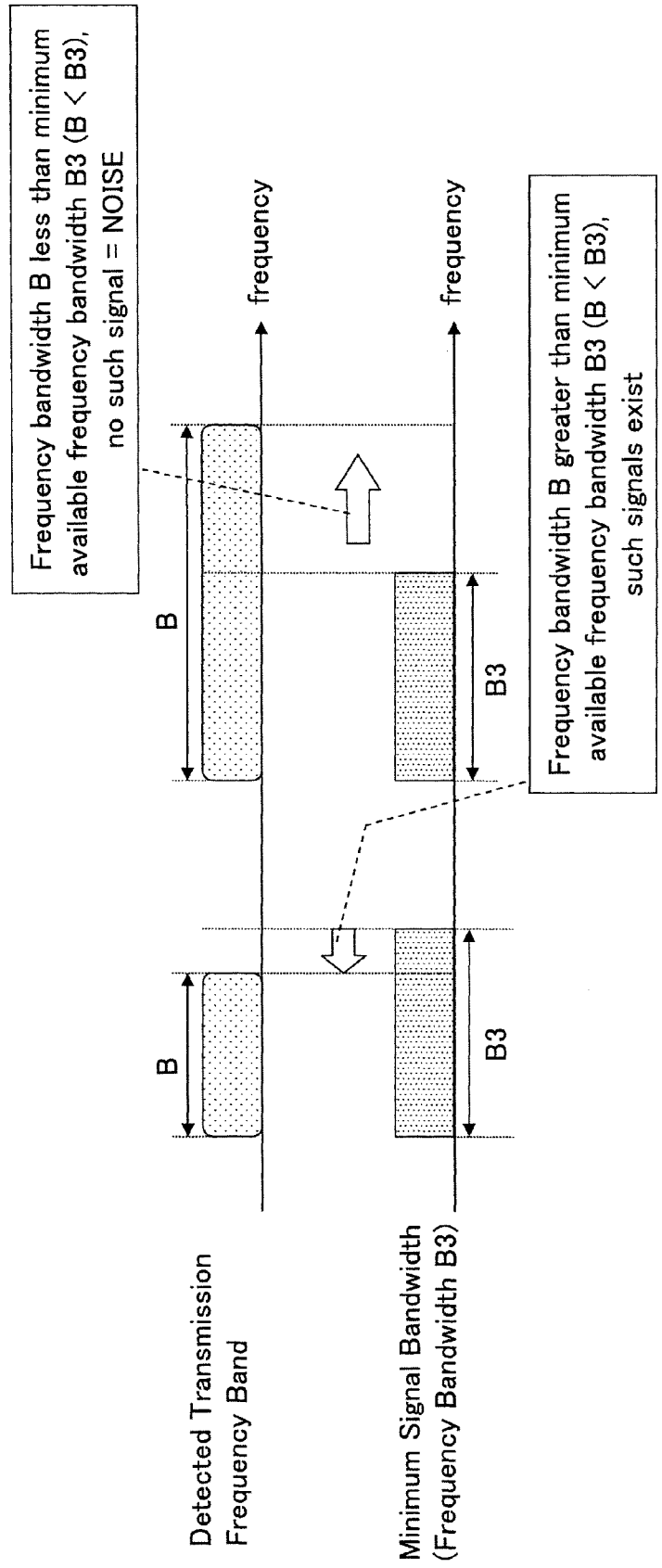
FIG. 14 is a diagram illustrating another method of determining the noise in the noise determination unit 125 by detecting the signal bandwidth of the decomposed signal components.

FIG. 14 is a diagram illustrating another method of determining the noise in the noise determination unit 125 by detecting signal bandwidth of the decomposed signal components.

As shown in FIG. 14, the noise determination unit 125 calculates the signal frequency bandwidth B from the detected signal transmission frequency bands, as described with reference to FIG. 13, and determines whether the frequency bandwidth B is less than a preset frequency bandwidth B3, which corresponds to the second predetermined value in claims of the present application.

For example, the preset frequency bandwidth B3 is a minimum signal bandwidth specified in advance, for example, it may be a minimum signal bandwidth available on the transmitter side.

If it is determined that the frequency bandwidth B is less than the preset frequency bandwidth B3, since there is no signal component which has a frequency bandwidth B even smaller than the minimum available frequency bandwidth B3, the noise determination unit 125 determines that signal components are noise in the detected frequency band.

On the contrary, if it is determined that the frequency bandwidth B is greater than the preset frequency bandwidth B3, since it is possible for signal components to have a frequency bandwidth B greater than the minimum available frequency bandwidth B3, the noise determination unit 125 determines that decomposed signal components D are not noise (that is, a signal) in the detected frequency band B.

The methods of noise determination as illustrated in FIG. 13 and FIG. 14 can be combined together, that is, if the frequency bandwidth B is greater than the minimum available frequency bandwidth B3 and less than the maximum available frequency bandwidth B2 added with a maximum Doppler frequency, the noise determination unit 125 determines that decomposed signal component D, which has the frequency bandwidth B, is not noise (that is, a signal) in the detected frequency band B.

Figure 15:
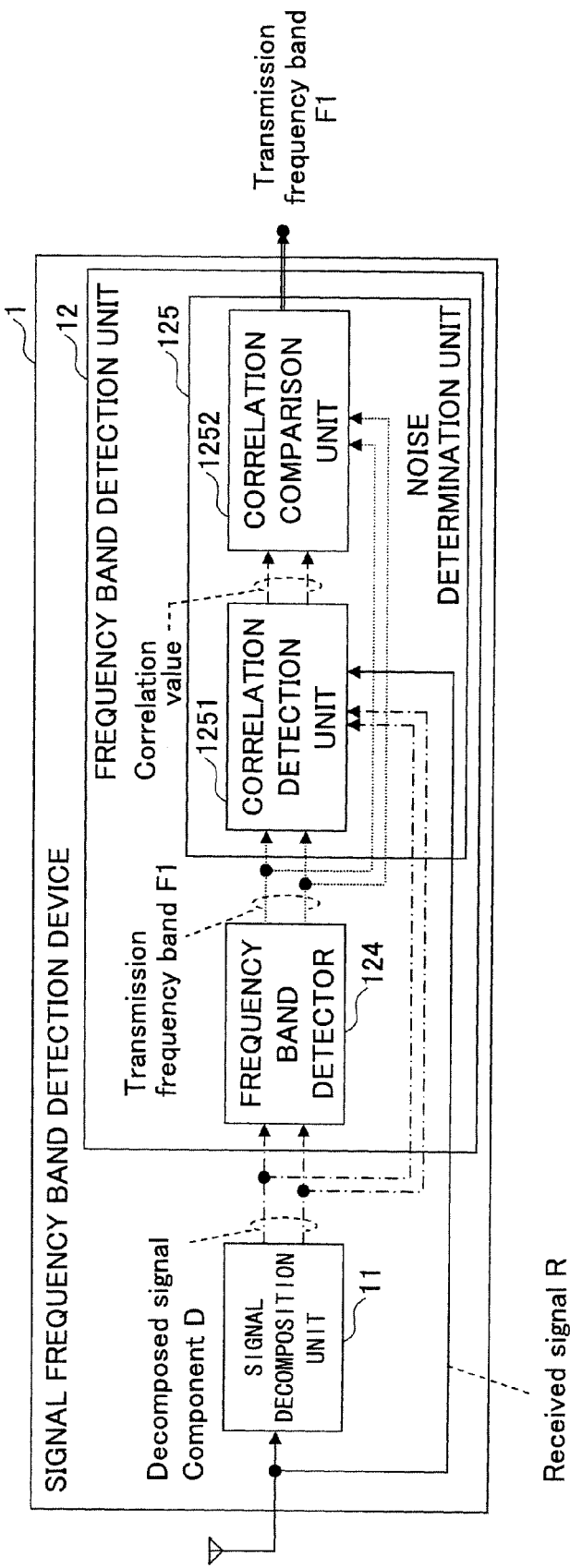
FIG. 15 is a block diagram illustrating an example of the structure of the noise determination unit 125 according to the present embodiment.

FIG. 15 is a block diagram illustrating an example of the structure of the noise determination unit 125 according to the present embodiment.

As shown in FIG. 15, the noise determination unit 125 includes a correlation detection unit 1251 and a correlation comparison unit 1252.

With the decomposed signal component D obtained by the signal decomposition unit 11 as a reference signal, the correlation detection unit 1251 detects the correlation between the decomposed signal component D and the received signal R in the signal transmission frequency band F1 detected by the frequency band detector 124. That is, the received signal R, the decomposed signal component D, and the signal transmission frequency band F1 are input to the correlation detection unit 1251, and the correlation detection unit 1251 detects the correlation between the decomposed signal component D and the received signal R in the signal transmission frequency band F1.

The correlation comparison unit 1252 determines that the decomposed signal component D is noise in the signal transmission frequency band F1 when the magnitude of the correlation detected by the correlation detection unit 1251 is less than or equal to a preset value CT1.

Specifically, the correlation value and the signal transmission frequency band F1 are input to the correlation comparison unit 1252, and the correlation comparison unit 1252 determines whether the decomposed signal component D is noise in the signal transmission frequency band F1 based on the input magnitude of the correlation and the preset value CT1.

Figure 16:
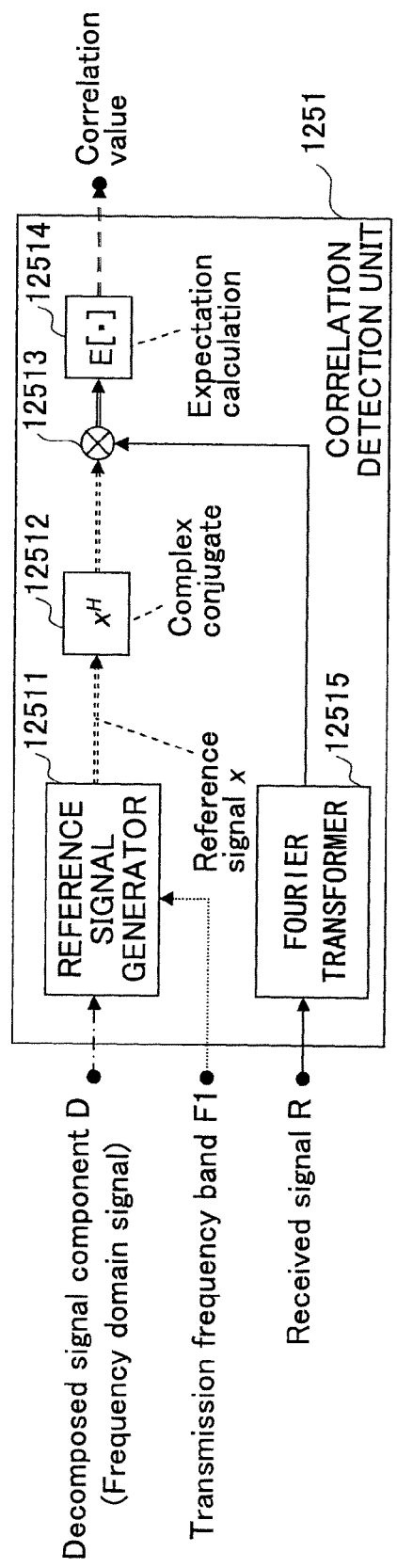
FIG. 16 is a block diagram illustrating an example of the structure of the correlation detection unit 1251 according to the present embodiment.

FIG. 16 is a block diagram illustrating an example of the structure of the correlation detection unit 1251 according to the present embodiment.

As shown in FIG. 16, the correlation detection unit 1251 includes a reference signal generator 12511, a complex conjugate calculator 12512, a multiplier 12513, an expectation calculator 12514, and a Fourier transformer 12515.

The reference signal generator 12511 of the correlation detection unit 1251 extracts a segment of the initially input decomposed signal component D corresponding to the signal transmission frequency band F1 detected by the frequency band detector 124.

Specifically, the decomposed signal components D (frequency domain signals) and the signal transmission frequency band F1 are input to the reference signal generator 12511, and the reference signal generator 12511 extracts a signal component, as a reference signal, corresponding to the signal transmission frequency band F1 from the decomposed signal component D based on the signal transmission frequency band F1. The procedure of extracting the reference signal is described below with reference to FIG. 17.

FIG. 17 shows a procedure of extracting a reference signal by the reference signal generator 12511 in the correlation detection unit 1251.

As shown in FIG. 17, for each of the detected signal transmission frequency bands F1, it is set that the decomposed signal components D are zero outside the detected signal transmission frequency bands F1.

Specifically, when a decomposed signal component D1 and a decomposed signal component D2 are obtained, the signal transmission frequency bands F1 of the decomposed signal component D1 are obtained to be $F1_{11}$ and $F1_{12}$, and the signal transmission frequency band F1 of the decomposed signal component D2 is obtained to be $F1_2$, the reference signal generator 12511 generates a signal corresponding to the decomposed signal component D1 but set to be zero outside the signal transmission frequency band $F1_{11}$, a signal corresponding to the decomposed signal component D1 but set to be zero outside the signal transmission frequency band $F1_{12}$, and a signal corresponding to the decomposed signal component D2 but set to be zero outside the signal transmission frequency band $F1_2$ as reference signals.

The complex conjugate calculator 12512 of the correlation detection unit 1251 calculates the complex conjugate of the segment of the decomposed signal components D extracted by the correlation detection unit 1251, and outputs the complex conjugate to the multiplier 12513.

At the same time, the received signal R is input to the Fourier transformer 12515 for Fourier transformation.

The multiplier 12513 of the correlation detection unit 1251 multiplies the complex conjugate of the segment of the decomposed signal components D given by the complex conjugate calculator 12512 by the received signal R after Fourier transformation, and outputs the results to the expectation calculator 12514.

The expectation calculator 12514 of the correlation detection unit 1251 calculates the expectation of the result of the multiplication, and outputs the expectation as the correlation value.

In this way, the correlation value is obtained.

When the magnitude of the correlation detected by the correlation detection unit 1251 is greater than or equal to the preset value CT1, the correlation comparison unit 1252 determines that the frequency band corresponding to the correlation value is the signal transmission frequency band F1 of the signal component S, and outputs the detection results of the signal transmission frequency band F1.

When the magnitude of the correlation detected by the correlation detection unit 1251 is less than the preset value CT1, the correlation comparison unit 1252 determines that the decomposed signal component D is noise in the signal transmission frequency band F1 corresponding to the correlation value, and due to this, the correlation comparison unit 1252 does not output the frequency band as the detection result of the signal transmission frequency band F1.

In doing so, it is possible to easily reduce the error detection rate of the signal transmission frequency band F1 of the signal component S included in the received signal R.

Figure 18:
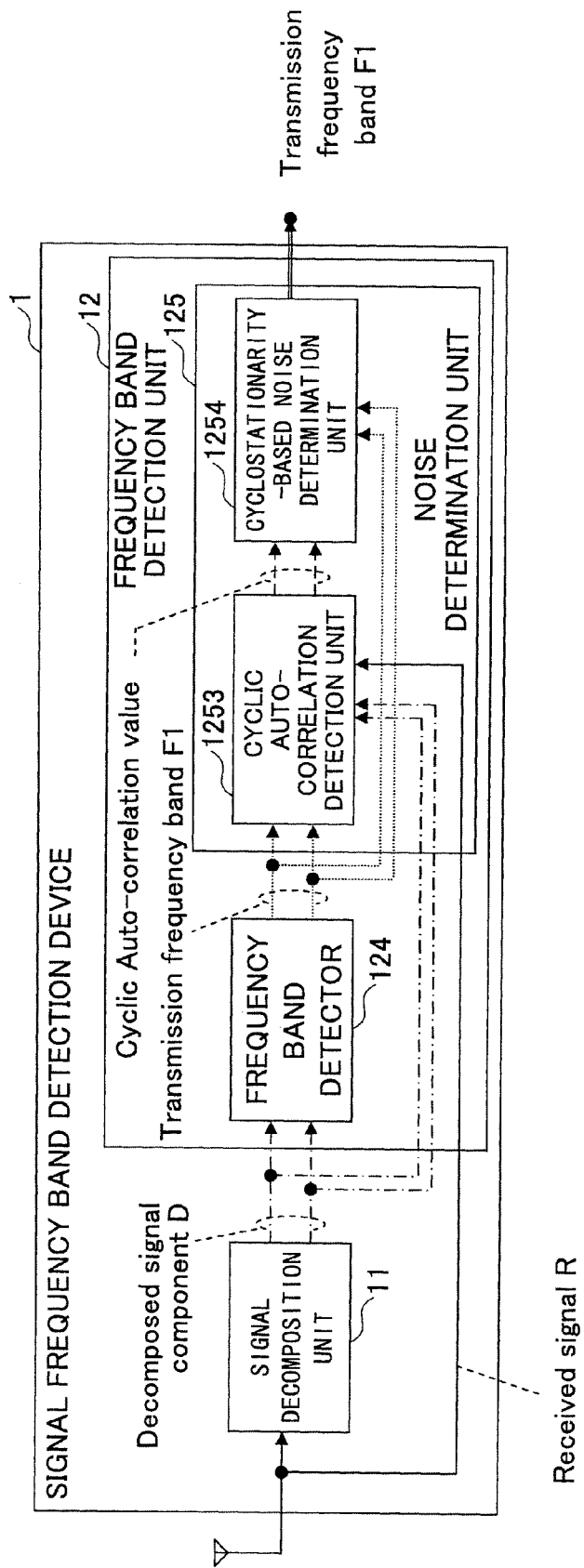
FIG. 18 is a block diagram illustrating another example of the structure of the noise determination unit 125 according to the present embodiment.

FIG. 18 is a block diagram illustrating another example of the structure of the noise determination unit 125 according to the present embodiment.

As shown in FIG. 18, the noise determination unit 125 includes a cyclic autocorrelation detection unit 1253 and a cyclostationarity-based noise determination unit 1254.

The cyclic autocorrelation detection unit 1253 calculates the cyclic autocorrelation of the decomposed signal components D obtained by the signal decomposition unit 11 in the signal transmission frequency bands F1 obtained by the frequency band detector 124.

Specifically, the received signal R, the decomposed signal components D, and the signal transmission frequency bands F1 are input to the cyclic autocorrelation detection unit 1253, and the cyclic autocorrelation detection unit 1253 calculates the cyclic autocorrelation of the decomposed signal components D in the signal transmission frequency bands F1.

The cyclic autocorrelation and the signal transmission frequency bands F1 are input to the cyclostationarity-based noise determination unit 1254, and the cyclostationarity-based noise determination unit 1254 determines whether the decomposed signal components D are noise in the detected signal transmission frequency band F1 from the cyclic autocorrelation obtained by the cyclic autocorrelation detection unit 1253.

Figure 19:
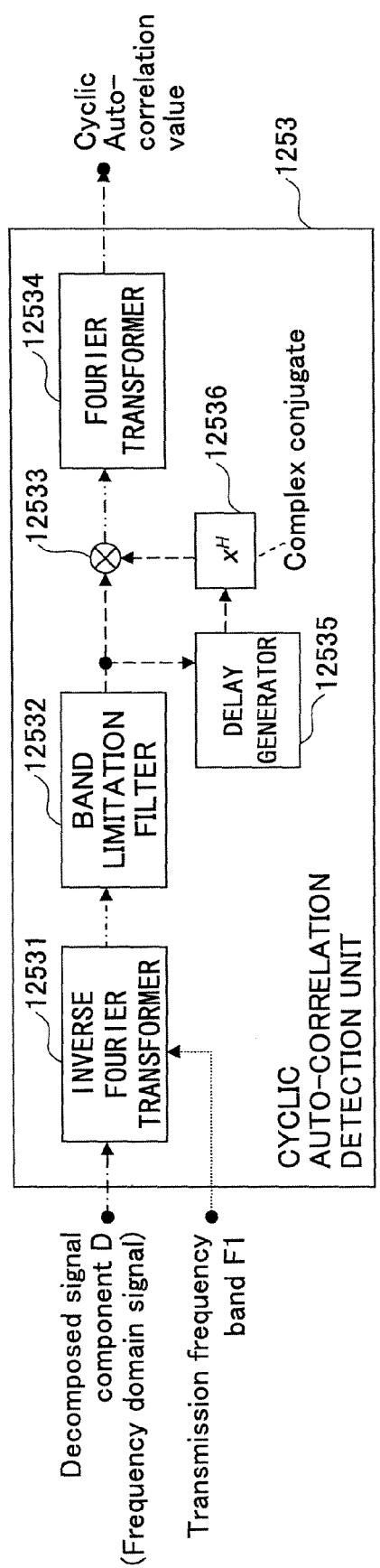
FIG. 19 is a block diagram illustrating an example of the structure of the cyclic autocorrelation detection unit 1253 according to the present embodiment.

FIG. 19 is a block diagram illustrating an example of the structure of the cyclic autocorrelation detection unit 1253 according to the present embodiment.

As shown in FIG. 19, the cyclic autocorrelation detection unit 1253 includes an inverse Fourier transformer 12531, a band limitation filter 12532, a multiplier 12533, a Fourier transformer 12534, a delay generator 12535, and a complex conjugate calculator 12536.

The inverse Fourier transformer 12531 of the cyclic autocorrelation detection unit 1253 extracts a frequency component of the initially input decomposed signal components D corresponding to the signal transmission frequency band F1 detected by the frequency band detector 124.

Specifically, when the decomposed signal components D are obtained, and the signal transmission frequency bands F1 of the decomposed signal components D are obtained, the inverse Fourier transformer 12531 sets the portion of the decomposed signal components D outside the detected signal transmission frequency bands F1 to be zero, and outputs the remaining portion of the decomposed signal components D as reference signals. Further, the inverse Fourier transformer 12531 transforms the extracted signal into the time domain.

The band limitation filter 12532 of the cyclic autocorrelation detection unit 1253 limits the frequency band, the thus obtained signals are delayed by the delay generator 12535, and the complex conjugate calculator 12536 calculates the complex conjugate $x^H(t-\tau)$ of the delayed signals.

The multiplier 12533 multiplies the signals x(t), which are output from the band limitation filter 12532 and are transformed to time domain signals.

The Fourier transformer 12534 performs Fourier transformation and obtains the cyclic autocorrelation.

Based on the cyclic autocorrelation obtained by the cyclic autocorrelation detection unit 1253, the cyclostationarity-based noise determination unit 1254 determines whether the decomposed signal components D corresponding to the detected signal transmission frequency bands F1 are noise or signals, and outputs the signal transmission frequency bands corresponding to the identified signals as the final results.

Below, descriptions are made of an example of noise determination method in the cyclostationarity-based noise determination unit 1254.

Figure 20:
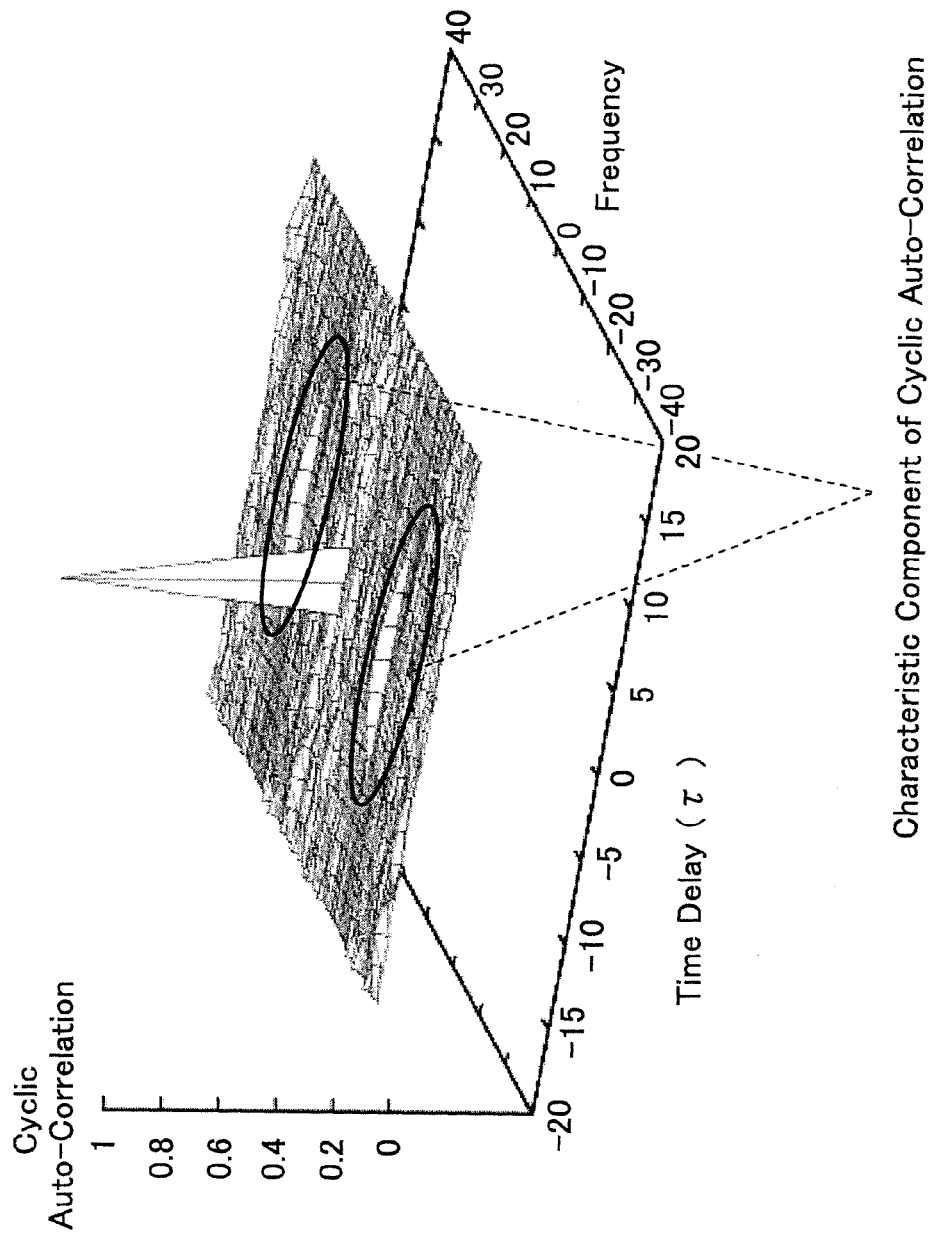
FIG. 20 shows an example of properties of the cyclic autocorrelation of the signals.

FIG. 20 shows an example of properties of the cyclic autocorrelation of the signals.

Usually, signals used for communications exhibit cyclostationarity, and as shown in FIG. 20, depending on modulation methods or symbol rates and so on, the signals exhibit characteristics in their cyclic autocorrelation. Based on the characteristics of the cyclic autocorrelation, the cyclostationarity-based noise determination unit 1254 prepares patterns of the cyclic autocorrelation for signal forms beforehand, such as modulation schemes likely to be used.

The cyclostationarity-based noise determination unit 1254 performs pattern matching between the prepared patterns and the calculated cyclic autocorrelation of the decomposed signal components D, and when any matched pattern is found, the corresponding signal component is determined to be a signal; otherwise, the corresponding signal component is determined to be noise. In this way, signals and noise can be distinguished.

In this way, even when power of noise included in the decomposed signal components is large, it is possible to distinguish signals and noise precisely, and it is possible to reduce the error detection rate of the signal transmission frequency band F1 of the signal component S included in the received signal R.

Second Embodiment

Figure 21:
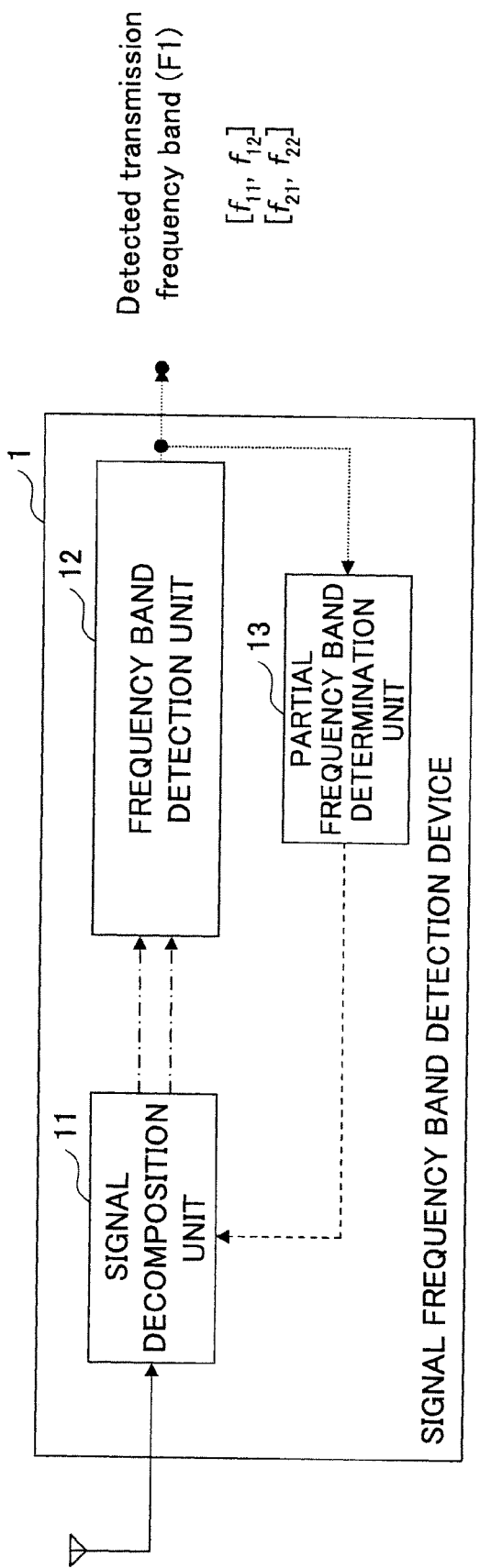
FIG. 21 is a block diagram schematically illustrating a signal frequency band detection device according to a second embodiment of the present invention.

FIG. 21 is a block diagram schematically illustrating a signal frequency band detection device according to a second embodiment of the present invention.

As illustrated in FIG. 21, a signal frequency band detection device 21 of the present embodiment includes a signal decomposition unit 11, a frequency band detection unit 12, and a partial frequency band determination unit 13.

Information of the signal transmission frequency bands F1 detected by the frequency band detection unit 12 is input to the partial frequency band determination unit 13. The partial frequency band determination unit 13 determines a partial frequency band I in which signal decomposition and signal transmission frequency band detection are to be performed again. The partial frequency band I determined by the partial frequency band determination unit 13 is input to the signal decomposition unit 11. The signal decomposition unit 11 performs signal decomposition and signal transmission frequency band detection again on the received signal R.

Figure 22:
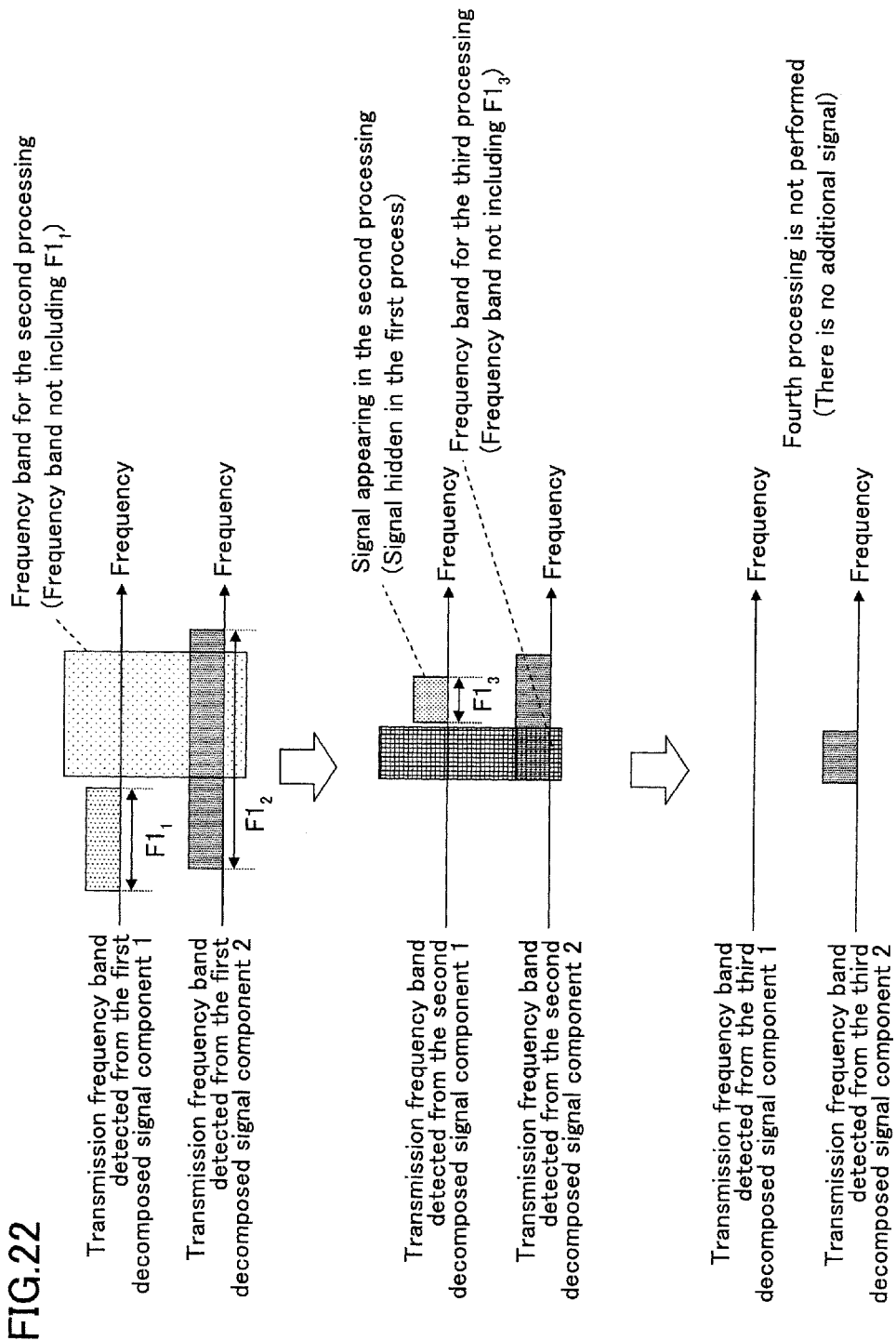
FIG. 22 is a diagram illustrating a method of determining the partial signal transmission frequency band I in the partial frequency band determination unit 13.

FIG. 22 is a diagram illustrating a method of determining the partial frequency band I in the partial frequency band determination unit 13.

In FIG. 22, it is exemplified that the signal transmission frequency bands $F1_1$ and $F1_2$ detected in the first signal frequency band detection overlap each other.

As described previously, in the signal frequency band detection device 1 of the first embodiment, during signal decomposition and signal transmission frequency band detection, the decomposed signal components D may be hidden in other signal components, and cannot be detected.

To solve this problem, in the signal frequency band detection device 21 of the present embodiment, signal decomposition and signal transmission frequency band detection are performed again in a frequency band not including the signal transmission frequency bands $F1_1$.

Specifically, as shown in FIG. 22, the frequency band not including the signal transmission frequency band $F1_1$, which is detected from the first decomposed signal component 1, is used as the frequency band, in which signal decomposition and signal transmission frequency band detection are performed again. Further, by the first signal decomposition, the signal transmission frequency band $F1_2$ is obtained, which is detected from the first decomposed signal component 2.

As a result, a signal transmission frequency band $F1_3$ is obtained from the decomposed signal component 1 after the second signal decomposition. The signal transmission frequency band $F1_3$ appears in the second signal decomposition, that is, it is hidden in the first signal decomposition.

In addition, a frequency band, which does not include the signal transmission frequency band $F1_1$ detected from the decomposed signal component 1 in the first signal decomposition and the signal transmission frequency band $F1_3$ detected from the decomposed signal component 1 in the second signal decomposition, is used as the frequency band in which signal decomposition and signal transmission frequency band detection are performed for the third time. In addition, a signal transmission frequency band is obtained from the decomposed signal component 2 in the second signal decomposition.

As a result, as shown in FIG. 22, there is no signal transmission frequency band detected from the decomposed signal component 1 in the third signal decomposition. Since signal components do not exist except for the signal components obtained in the first and second signal decomposition and the signal transmission frequency band, the fourth signal decomposition is not performed. In addition, a signal transmission frequency band is obtained from the decomposed signal component 2 in the third signal decomposition. When a signal transmission frequency band is obtainable from the decomposed signal component 1 in the third signal decomposition, the same process is performed as in the first and second signal decompositions. In other words, among the signal transmission frequency bands corresponding to the signal components, signal decomposition is performed again at least in one partial signal transmission frequency band out of the detected signal transmission frequency bands.

As a result of the above processing, it is possible to detect the signal transmission frequency bands of signal components which are not detected in the first time frequency band detection, and it is possible to detect the signal transmission frequency bands of signal components S included in the received signal R in detail.

Figure 23:
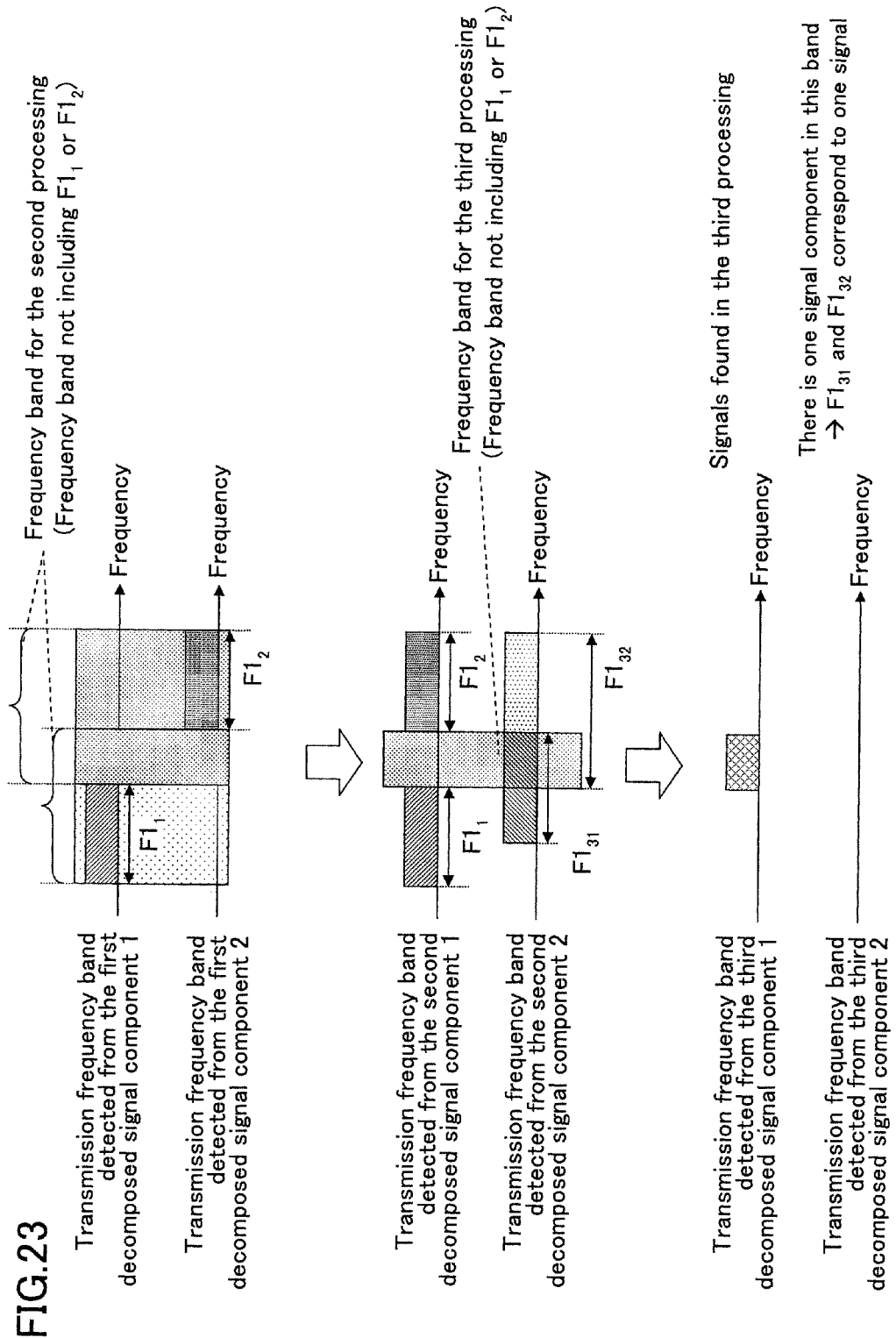
FIG. 23 is a diagram illustrating the method of determining the partial signal transmission frequency band I in the partial frequency band determination unit 13.

FIG. 23 is a diagram illustrating the method of determining the partial signal transmission frequency band I in the partial frequency band determination unit 13.

Here, it is exemplified that the signal transmission frequency bands $F1_1$ and $F1_2$ detected in the first signal frequency band detection do not overlap each other. In this example, it is likely that signals of wide signal bands will be received while being hidden in the signal components S.

In this case, although the signal decomposition and signal transmission frequency band detection are performed for the second time in a frequency band not including the signal transmission frequency band $F1_1$ and a frequency band not including the signal transmission frequency band $F1_2$, the signal decomposition and signal transmission frequency band detection are performed in an overlapping portion of the frequency band not including the signal transmission frequency band $F1_1$ and the frequency band not including the signal transmission frequency band $F1_2$. Namely, the signal decomposition and signal transmission frequency band detection are performed again in a frequency band not including both the signal transmission frequency band $F1_1$ and the signal transmission frequency band $F1_2$.

In the second processing, when both a detected signal transmission frequency band $F1_{31}$ and a detected signal transmission frequency band $F1_{32}$ include the whole frequency band, which does not include both the signal transmission frequency band $F1_1$ and the signal transmission frequency band $F1_2$, it is necessary to confirm whether the signal component corresponding to the detected signal transmission frequency band $F1_3$, and the signal component corresponding to the detected signal transmission frequency band $F1_{32}$ are the same signal. Then, the signal decomposition and signal transmission frequency band detection are performed for the third time only in the frequency band not including both the signal transmission frequency band $F1_1$ and the signal transmission frequency band $F1_2$.

In the third processing, when there is only one signal component in the frequency band not including both the signal transmission frequency band $F1_1$ and the signal transmission frequency band $F1_2$, it is determined that the signal component corresponding to the detected signal transmission frequency band $F1_{31}$ and the signal component corresponding to the detected signal transmission frequency band $F1_{32}$ are the same signal, and the combined signal transmission frequency band is output as the detection result of the signal transmission frequency band F1.

In the third processing, when there are plural signal components in the frequency band not including both the signal transmission frequency band $F1_1$ and the signal transmission frequency band $F1_2$, it is determined that the signal component corresponding to the detected signal transmission frequency band $F1_{31}$ and the signal component corresponding to the detected signal transmission frequency band $F1_{32}$ are different signals.

In this way, even when received signal components having wide signal frequency bands are hidden in the signal components S corresponding to the signal transmission frequency band F1 detected in the first signal frequency band detection, it is possible to detect the hidden signal components.

Namely, the signal transmission frequency band $F1_1$ detected from the first decomposed signal component 1, and the signal transmission frequency band $F1_2$ detected from the first decomposed signal component 2 are obtained, and the frequency band not including the signal transmission frequency band $F1_1$ or the signal transmission frequency band $F1_2$, specifically, the frequency band not including the signal transmission frequency band F1 and the frequency band not including the signal transmission frequency band $F1_2$ are used as the frequency band for the second processing.

As a result, a signal transmission frequency band $F1_{31}$ and a signal transmission frequency band $F1_{32}$ detected from the second decomposed signal component 1 are obtained. Next, the third time signal transmission frequency band detection is performed only in the frequency band not including both the signal transmission frequency band $F1_1$ and the signal transmission frequency band $F1_2$.

In the third processing, as shown in FIG. 23, only one signal is detected in the frequency band not including both the signal transmission frequency band $F1_1$ and the signal transmission frequency band $F1_2$. In this case, it is determined that the signal component corresponding to the detected signal transmission frequency band $F1_{31}$ and the signal component corresponding to the detected signal transmission frequency band $F1_{32}$ are the same signal, and the combined signal transmission frequency band is output as the detection result of the signal transmission frequency band F1. That is, it is determined that the detected signal transmission frequency band $F1_{31}$ and the detected signal transmission frequency band $F1_{32}$ correspond to the same signal.

Third Embodiment

Figure 24:
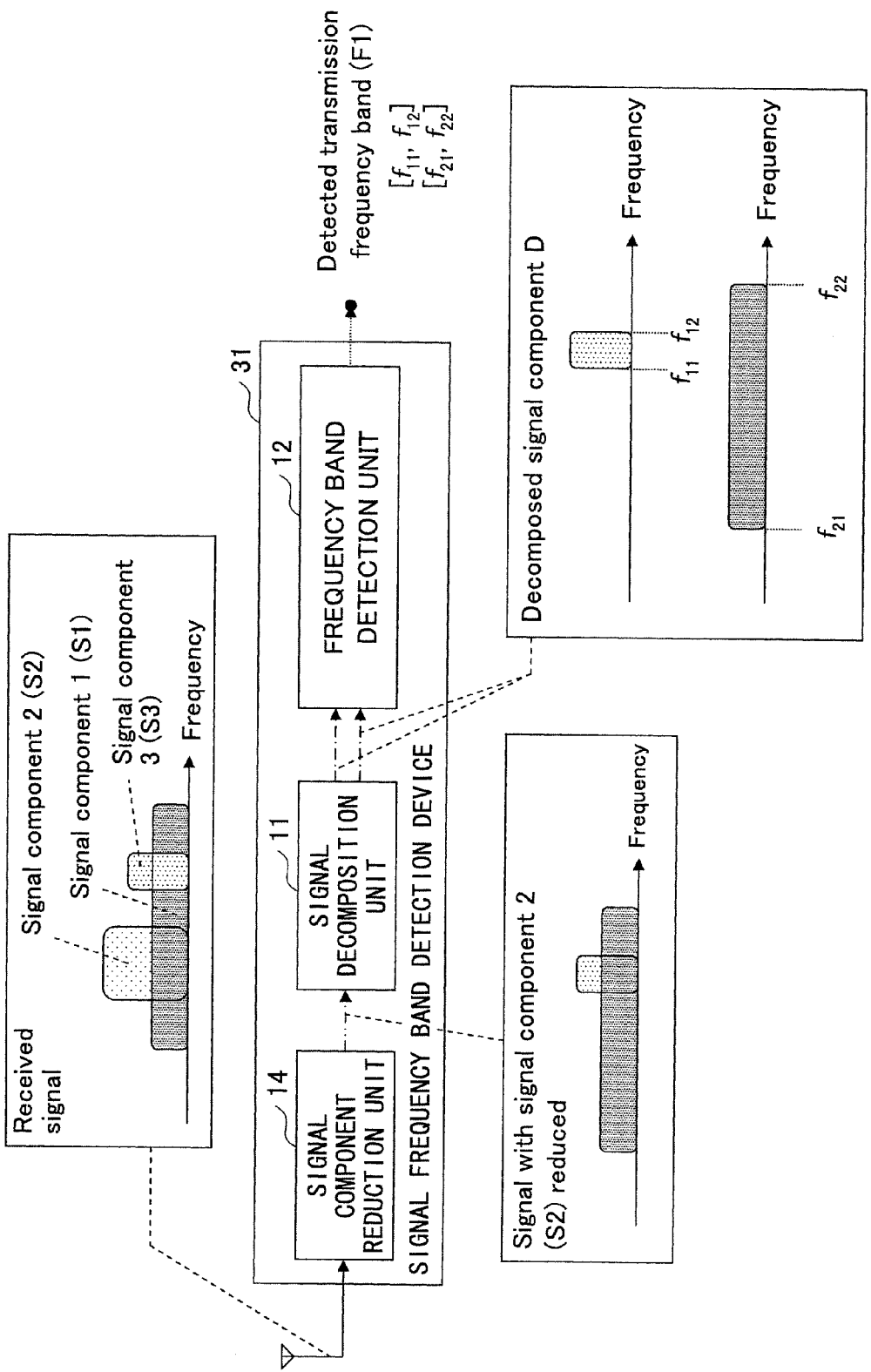
FIG. 24 is a block diagram schematically illustrating a signal frequency band detection device according to a third embodiment of the present invention.

FIG. 24 is a block diagram schematically illustrating a signal frequency band detection device according to a third embodiment of the present invention.

As illustrated in FIG. 24, a signal frequency band detection device 31 of the present embodiment includes a signal component reduction unit 14, a signal decomposition unit 11, and a frequency band detection unit 12.

In the present embodiment, the signal frequency band detection device 31 is used when information of one or more signal components is known among the plural signal components S included in the received signal R.

In the signal frequency band detection device 31 of the present embodiment, for example, by a null operation of an antenna, one or more signal components of the signal components S included in the received signal R are suppressed prior to signal frequency band detection.

In the present embodiment, for the purpose of illustration, assume among a signal component 1 (S1), a signal component 2 (S2), and a signal component 3 (S3), which are included in the received signal R, information of the signal component 2 (S2) is known, and under this condition, the signal transmission frequency bands F1 of the signal component 1 (S1) and the signal component 3 (S3) are detected.

The signal component reduction unit 14 reduces the signal component 2 (S2) of the received signal R, and outputs the thus processed received signal R to the signal decomposition unit 11. The signal decomposition unit 11 and the frequency band detection unit 12 perform signal decomposition and frequency band detection on the received signal R, the signal component 2 (S2) of which is reduced.

Since part of the signal components of the received signal R can be reduced precisely by using the known information of the signal components, and signal decomposition and frequency band detection are performed on the signal component-reduced received signal R, it is possible to reduce the influence of interference from the signal components that ought to be reduced, and precisely detect the signal transmission frequency bands without being influenced by the signal components that ought to be reduced.

Figure 25:
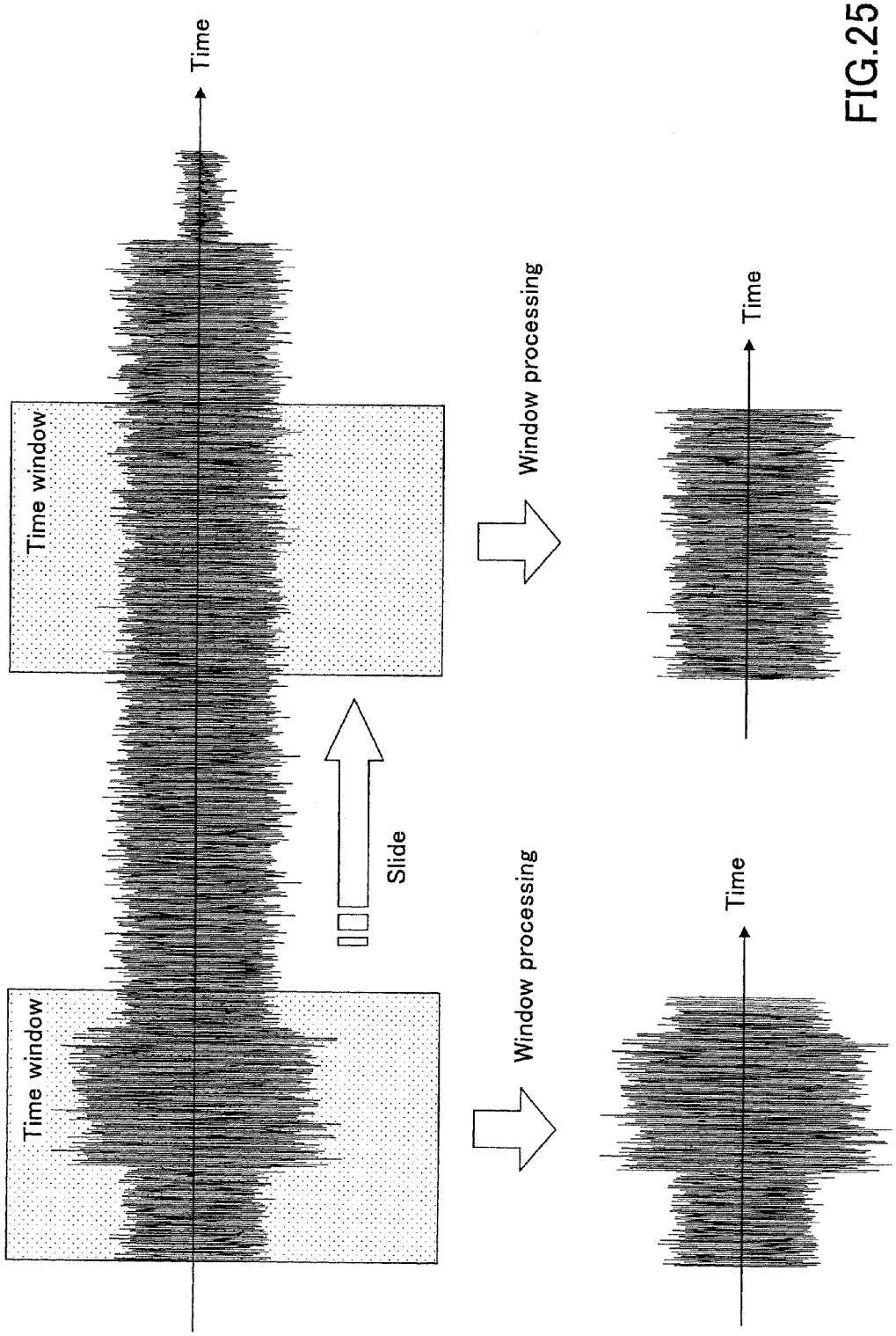
FIG. 25 illustrates an example of operations of the signal decomposition unit 11 by using a time window.

FIG. 25 illustrates an example of operations of the signal decomposition unit 11 by using a time window.

As shown in FIG. 25, the signal decomposition unit 11 of the signal frequency band detection device 31 can perform operations by using a time window.

As shown in FIG. 25, the signal decomposition unit 11 uses a time window to select a time interval of the received signal R, and decomposes the received signal R into plural signal components S in the selected time interval. For example, the signal decomposition unit 11 may slide the time window sequentially to detect the signal transmission frequency band over the whole time range.

In this way, since the received signal, which is to be decomposed, can be narrowed down to a small time interval, it is possible to precisely decompose the received signal R. Further, since the length of the signal processed in the signal decomposition is small, it is possible to reduce the amount of calculations.

Figure 26:
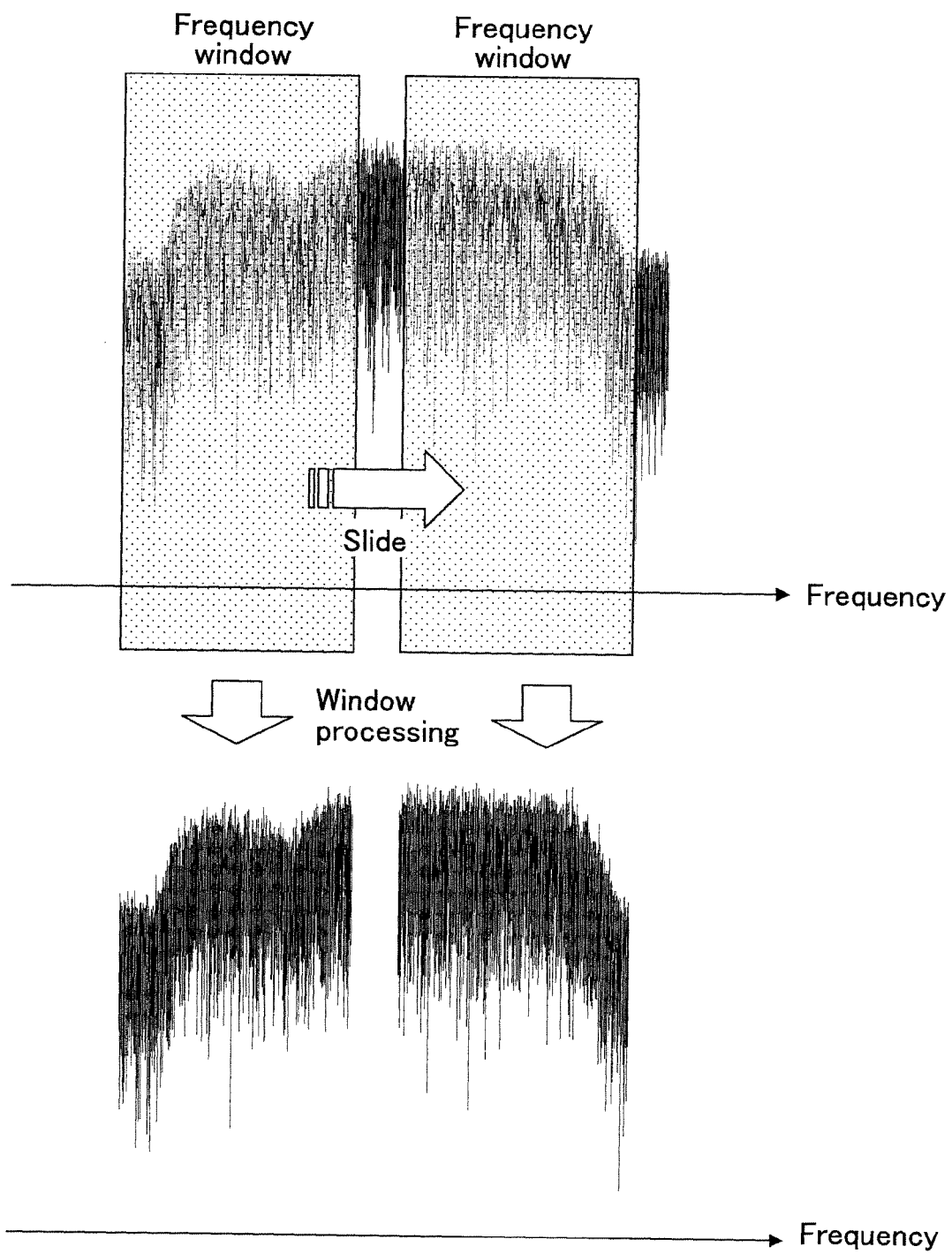
FIG. 26 illustrates another example of operations of the signal decomposition unit 11.

FIG. 26 illustrates another example of operations of the signal decomposition unit 11.

As shown in FIG. 26, the signal decomposition unit 11 of the signal frequency band detection device 31 can perform operations by using a frequency window.

As shown in FIG. 26, the signal decomposition unit 11 uses a frequency window to select a preset frequency width of the received signal R, and decomposes the received signal R into plural signal components S in the selected frequency width. For example, the signal decomposition unit 11 may slide the frequency window sequentially to detect the signal transmission frequency band over the whole frequency range.

Figure 27:
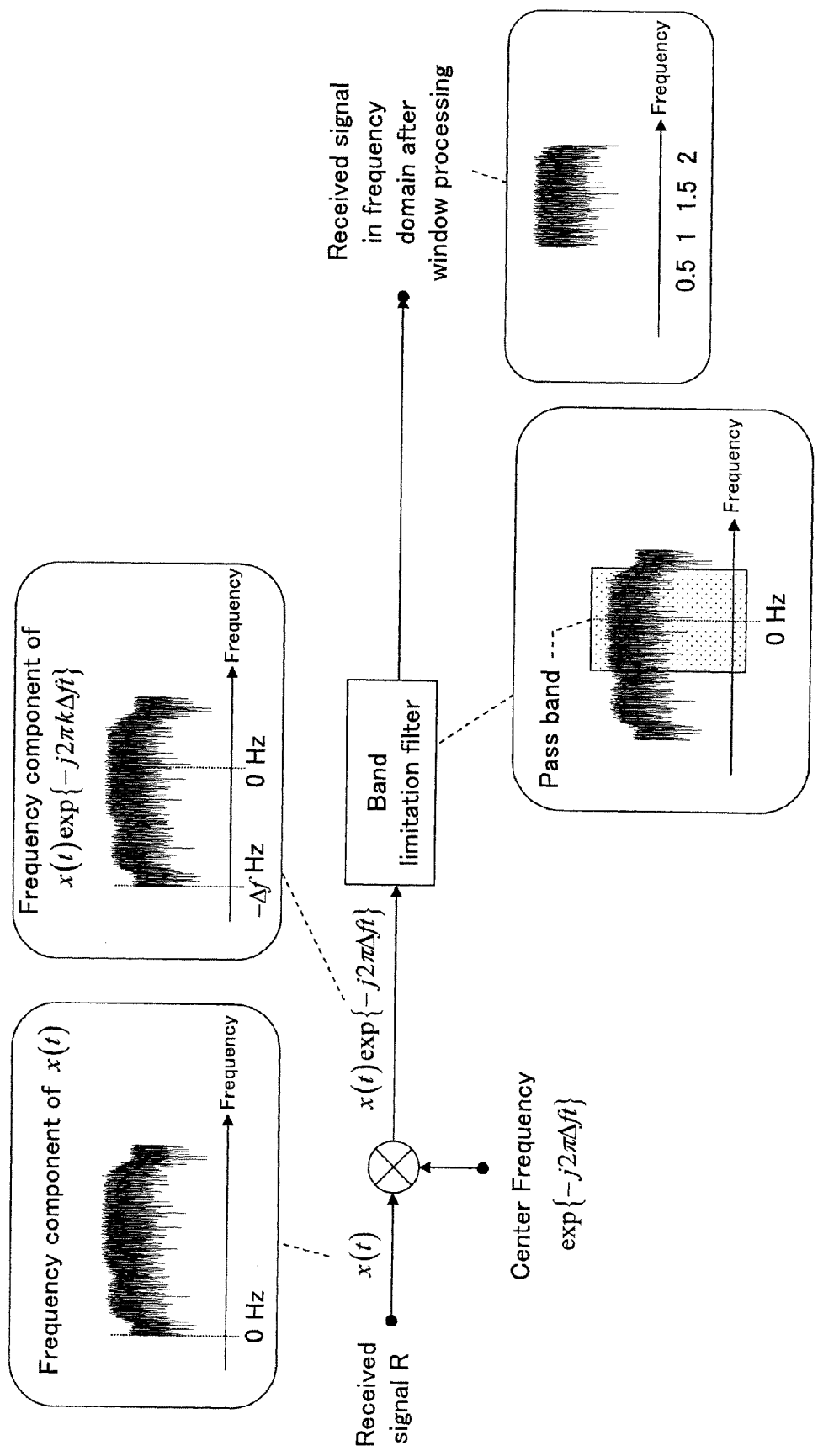
FIG. 27 illustrates an example of operations of the signal decomposition unit 11 by using a frequency window.

FIG. 27 illustrates an example of operations of the signal decomposition unit 11 by using a frequency window.

In FIG. 27, first, the received signal R(x(t)) is multiplied by a rotator exp {−j2πΔft} to shift a center frequency of the signal. Next, the signal with the shifted center frequency is input to a band limitation filter to limit the band of the signal to a preset bandwidth.

With the shifted center frequency as a new center frequency, a portion of the signal corresponding to a pass band of the band limitation filter can be extracted, thereby realizing the frequency window processing to select a certain frequency width of the received signal R.

In this way, since the received signal, which is to be decomposed, can be narrowed down to a small frequency width, it is possible to detect the signal transmission frequency bands of signal components in a detailed manner. Further, since it is not necessary to perform the Fourier transformation in the whole frequency range to be processed, it is possible to reduce the amount of calculations.

According to the above embodiments, even when parameters of the signal components included in the received signal R are not known, it is possible to detect the signal transmission frequency bands of the received signal components, which overlap with each other in the same frequency band.

In addition, when the signal processing of the above embodiment is performed in a signal receiver, it is possible to separately detect frequency bands used for transmission of these signal components.

The signal frequency band detection device of the present invention is applicable to a radio signal receiving device.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2006-150462 filed on May 30, 2006, the entire contents of which are hereby incorporated by reference.

What is claimed is:

1. A signal frequency band detection device comprising:
   a signal decomposition unit that decomposes a received signal into a plurality of signal components, where signal transmission frequency bands of the signal components are at least partially overlap each other; and
   a frequency band detection unit that, based on respective electrical powers of the signal components, detects the respective signal transmission frequency bands of the signal components, wherein the frequency band detection unit detects the amount of fluctuations of the electrical powers of the signal components in a frequency domain, and detects the signal transmission frequency bands of the signal components based on whether the amount of fluctuations are greater than a predetermined value.

2. The signal frequency band detection device as claimed in claim 1, wherein the signal decomposition unit decomposes the received signal into the signal components based on independence of the signal components.

3. The signal frequency band detection device as claimed in claim 1, further comprising
   a noise determination unit that determines whether the signal components corresponding to the detected signal transmission frequency bands are noise, and
   outputs only the detected signal transmission frequency bands of the signal components that are not noise.

4. The signal frequency band detection device as claimed in claim 3, wherein
   the noise determination unit determines that the corresponding signal component is noise when a frequency bandwidth of the detected signal transmission frequency band is greater than a first predetermined value.

5. The signal frequency band detection device as claimed in claim 3, wherein the noise determination unit determines that the corresponding signal component is noise when a frequency bandwidth of the detected signal transmission frequency band is less than a second predetermined value.

6. The signal frequency band detection device as claimed in claim 1, wherein the signal decomposition unit decomposes the received signal in a partial frequency band into signal components again.

7. The signal frequency band detection device as claimed in claim 6, wherein the partial frequency band is a frequency band that does not include at least one of the detected signal transmission frequency bands of the signal components.

8. The signal frequency band detection device as claimed in claim 1, further comprising:
   a signal component reduction unit that reduces one or more of the signal components, wherein
   the signal decomposition unit decomposes the received signal processed by the signal component reduction unit into the signal components, and
   the frequency band detection unit detects the signal transmission frequency bands of the signal components.

* * * * *